United States Patent
Yoshida et al.

(10) Patent No.: US 9,046,153 B2
(45) Date of Patent: *Jun. 2, 2015

(54) RATCHET TENSIONER

(75) Inventors: Osamu Yoshida, Osaka (JP); Yuuji Kurematsu, Osaka (JP); Akira Ishii, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/992,836

(22) PCT Filed: Feb. 22, 2012

(86) PCT No.: PCT/JP2012/054251
§ 371 (c)(1),
(2), (4) Date: Jun. 10, 2013

(87) PCT Pub. No.: WO2012/117912
PCT Pub. Date: Sep. 7, 2012

(65) Prior Publication Data
US 2013/0274045 A1 Oct. 17, 2013

(30) Foreign Application Priority Data
Feb. 28, 2011 (JP) ................ 2011-041647

(51) Int. Cl.
*F16H 7/08* (2006.01)

(52) U.S. Cl.
CPC ............... *F16H 7/08* (2013.01); *F16H 7/0848* (2013.01); *F16H 2007/0806* (2013.01); *F16H 2007/0812* (2013.01); *F16H 2007/0853* (2013.01); *F16H 2007/0859* (2013.01)

(58) Field of Classification Search
CPC . F16H 7/08; F16H 7/0848; F16H 2007/0806; F16H 2007/0808; F16H 2007/0853; F16H 2007/0859; F16H 2007/0812

USPC .......... 474/101, 109, 110, 111, 140
See application file for complete search history.

(56) References Cited

U.S. PATENT DOCUMENTS

| | | | |
|---|---|---|---|
| 6,447,415 B1 | 9/2002 | Hashimoto et al. | |
| 6,454,672 B2* | 9/2002 | Kurohata | 474/111 |
| 6,547,684 B2 | 4/2003 | Kurohata | |
| 6,612,951 B2* | 9/2003 | Kurohata | 474/109 |
| 6,767,302 B2 | 7/2004 | Seungpyo | |
| 2003/0236144 A1 | 12/2003 | Seungpyo | |
| 2010/0298078 A1 | 11/2010 | Hirayama et al. | |

FOREIGN PATENT DOCUMENTS

JP      2559664 Y2     1/1998

* cited by examiner

*Primary Examiner* — Sang Kim
*Assistant Examiner* — Juan Campos, Jr.
(74) *Attorney, Agent, or Firm* — Howson & Howson LLP

(57) ABSTRACT

There is provide a ratchet-type tensioner that enables to readily disengage a plunger from a ratchet element in maintaining an engine, that engages the plunger reliably with the ratchet element in operating the engine so as to reduce flapping noise, and that prevents seizure of the plunger. A ratchet releasing mechanism X configured to release an engagement of the ratchet teeth 151 of the ratchet element 150 with the rack teeth 122 of the plunger 120 by means of a tool pin T includes a ratchet releasing pin guide hole 114 formed through the housing body 110 to insert a pin edge portion T1 of the tool pin T into a plunger-side edge region of the ratchet element 150 and a ratchet releasing pin engaging hole 155 formed in the plunger-side edge region of the ratchet element 150 to guide and engage the pin edge portion T1 of the tool pin T inserted from the ratchet releasing pin guide hole 114.

11 Claims, 19 Drawing Sheets

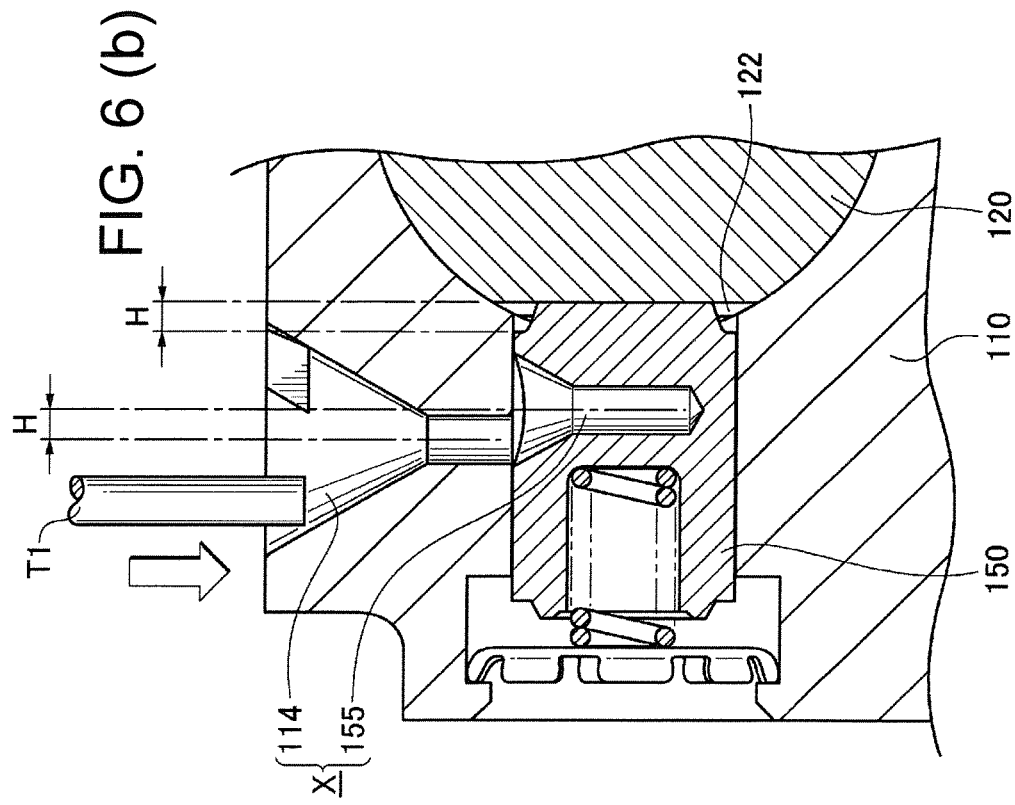
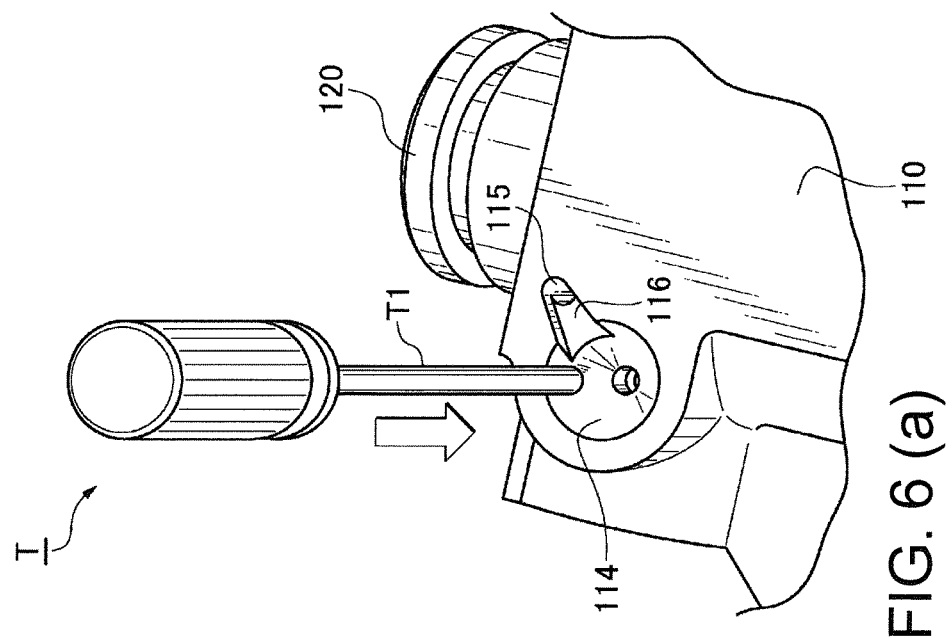

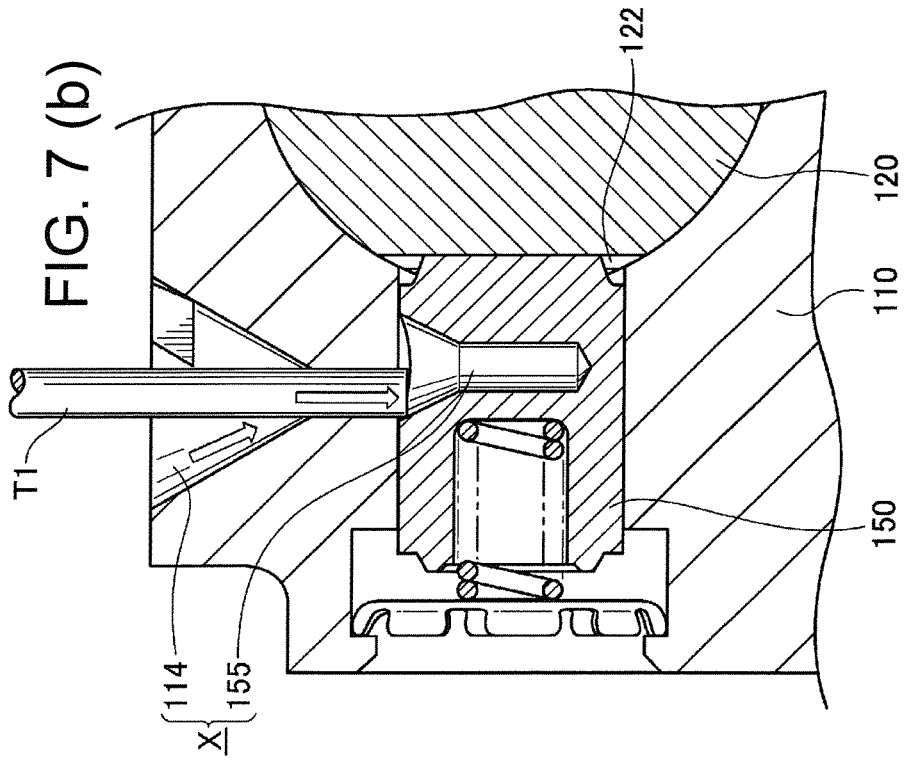
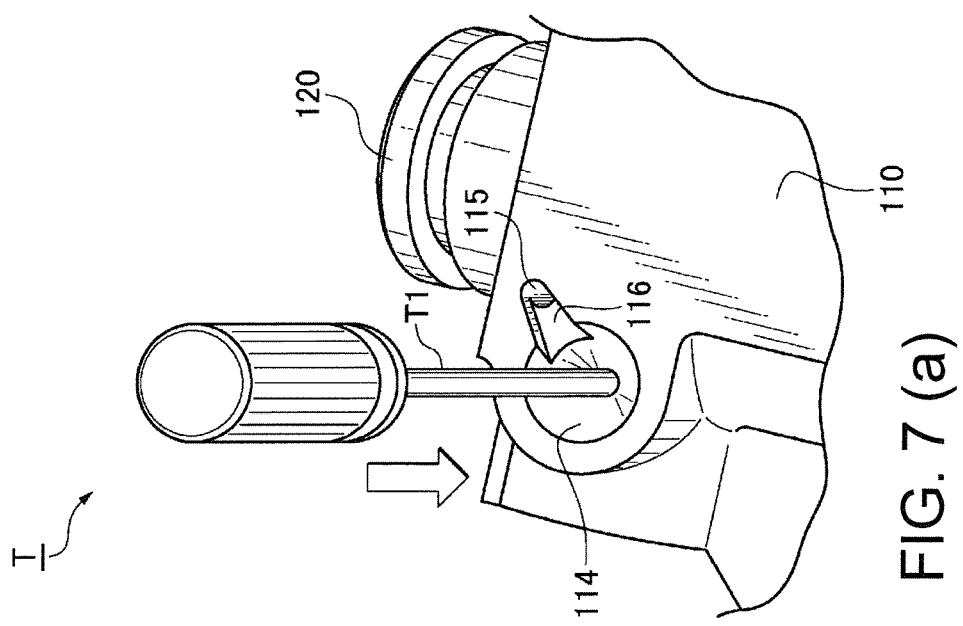
FIG. 7(a)
FIG. 7(b)

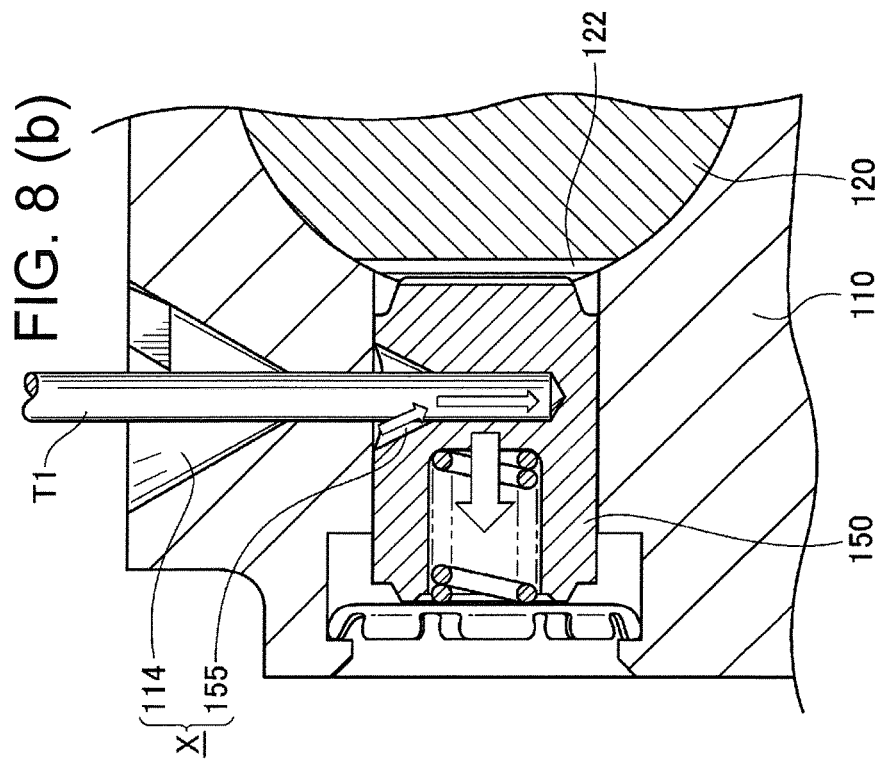
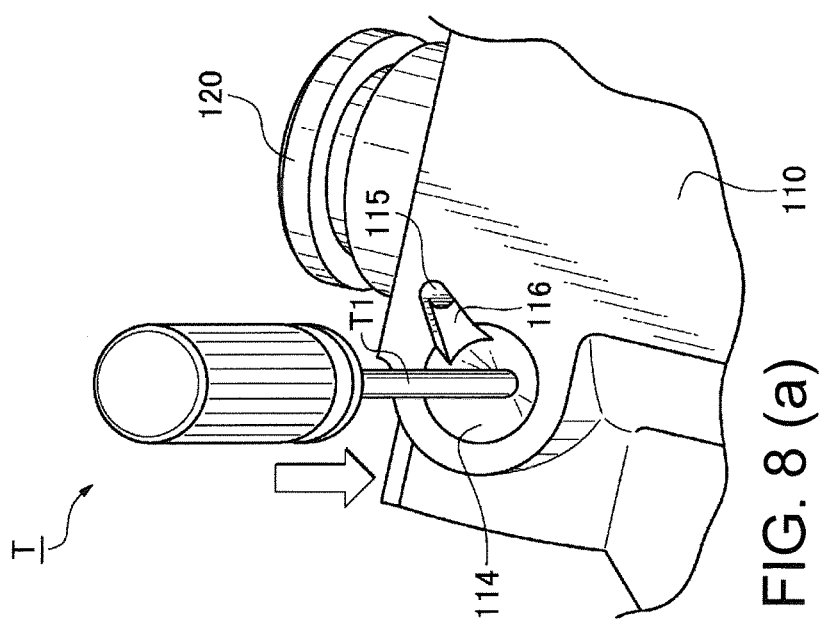

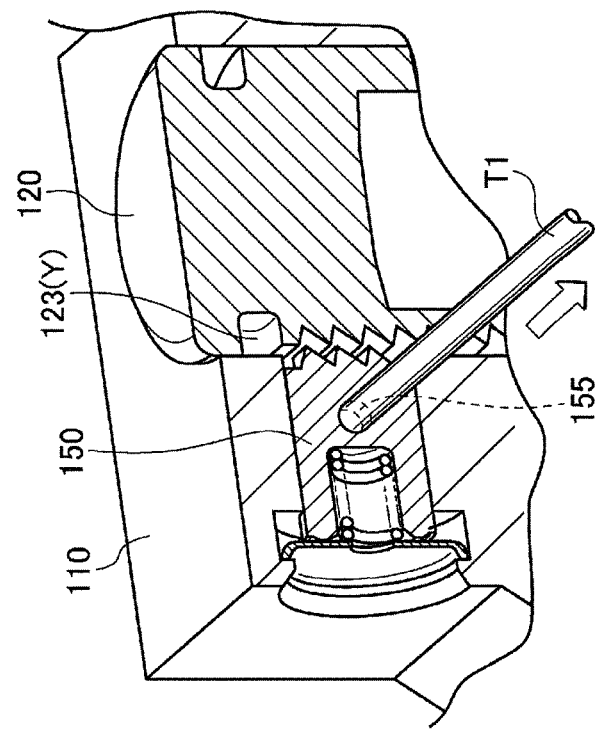
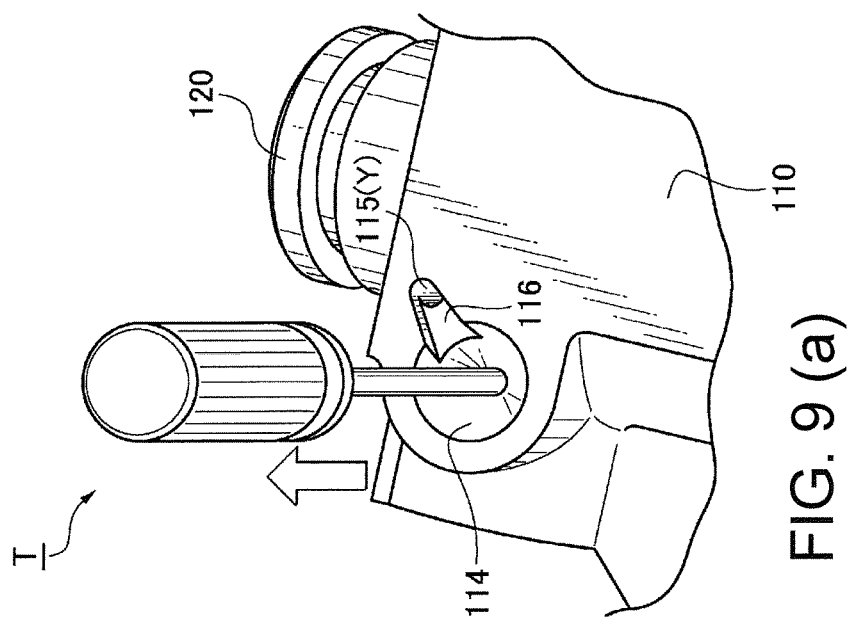
FIG. 9 (b)
FIG. 9 (a)

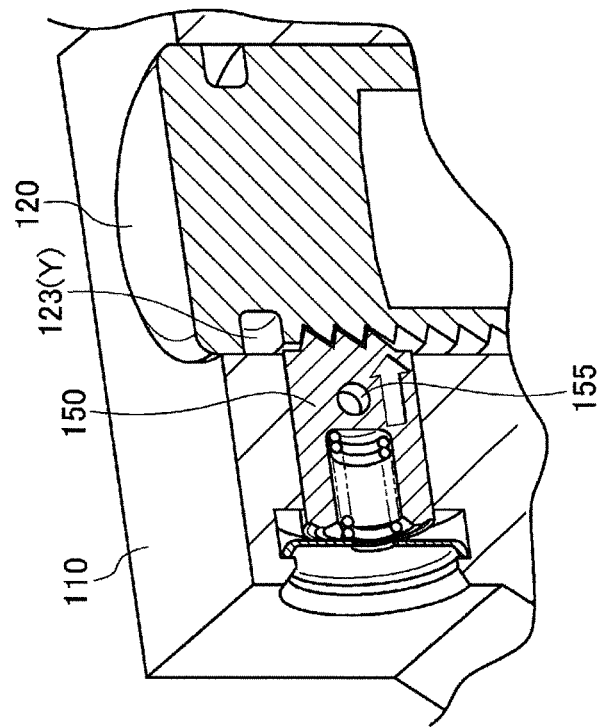
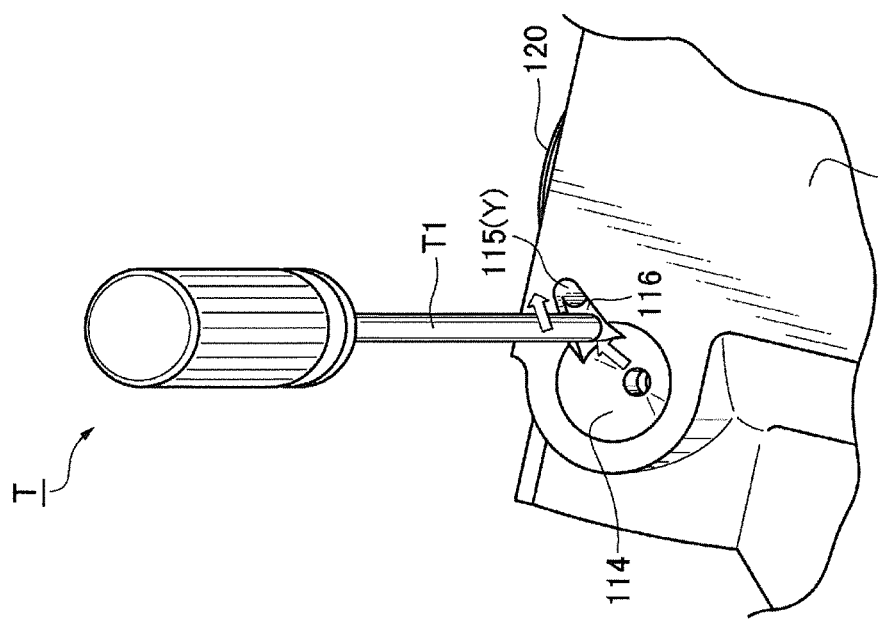
FIG. 10 (b)
FIG. 10 (a)

f1=F1 × sin θ × cos θ

$f1 = F1 \times \sin\theta \times \cos\theta \times \mu$ $$f2 = F2 \times \sin\theta \times \cos\theta \times \mu$$

$$f2 = F2 \times \sin\theta \times \cos\theta \times \mu$$

$$f1 = F1 \times \sin\theta \times \cos\theta \times \mu$$

RATCHET TENSIONER

FIELD OF THE INVENTION

The present invention relates to a ratchet-type tensioner configured to apply tension to a timing chain for driving camshafts and others of an engine.

BACKGROUND ART

Hitherto, there has been known a tensioner used for a timing chain for driving camshafts and others of an engine to apply tension to the timing chain by exerting a force for projecting a plunger slidably and fittingly inserted into a housing and forming an oil chamber between the plunger and the housing by a spring and an external hydraulic pressure.

As such prior art tensioner, a ratchet-type tensioner 500 as shown in FIG. 16 is adopted for example. The ratchet-type tensioner 500 includes a piston 526 slidably and fittingly inserted into a housing 512 in a direction orthogonal to a sliding direction of a plunger 514 and forming a sub-oil chamber 520 between the piston 526 and the housing 512, an oil passage 544 for causing external hydraulic pressure act on the sub-oil chamber 520, an air chamber 528 containing a second spring 534 for biasing the piston 526 toward the sub-oil chamber 520, provided on the side opposite from the sub-oil chamber 520, and sectioned and formed by the housing 512 and the piston 526, an air communicating hole 532 provided in communication with the air chamber 528 and closed by the piston 526 when the external hydraulic pressure acts on the sub-oil chamber 520 and the piston 526 moves against a biasing force of the second spring 534, rack teeth 538 engraved on a part of the plunger 514 surrounded by the housing 512, and a plurality of engaging teeth 536 capable of engaging with the rack teeth 538 and provided at an edge of a rod 524 fixed to the piston 526, wherein tooth surfaces for blocking retraction of the plunger of the engaging teeth 536 and the rack 538 are formed at right angles with respect to a direction in which the plunger 514 advances/retracts (see Patent Literature 1 for example).

PRIOR ART LITERATURE

Patent Literature

[Patent Literature 1] Japanese Utility Model No. 2559664 (Claims, FIG. 1)

Problems to be Solved by the Invention

The prior art tensioner 500 described above has problems that because the plunger 514 is biased by the spring 518 so as to advance and project out, it is unable to push and retract the plunger 514 within the plunger sliding hole of the housing 512 in attaching the tensioner 500 within the engine, and the plunger 514 holding the spring 518 therein has to be inserted within the plunger sliding hole after attaching the housing 512.

Still further, works for replacing engine parts can be made by returning and fixing the plunger 514 at a rear position and even if one tries to push back and retract the plunger 514 arbitrarily, it is unable to disengage the engagement teeth 536 of the rod 524 from the rack 538 of the plunger 514 because the rod 524 provided with the plurality of engagement teeth 536 is accommodated within the air chamber 528 and is sealed by the cap 530. Then, such works require to bring down the engine from a vehicle, posing such a cumbersome problem in the engine maintenance works that a load of large-scale operations is forced.

Then, while such a series of maintenance works is carried out through a maintenance hole provided through an engine cover covering an engine block wall not shown, regions around the maintenance hole are often invisible spaces and operators rely on their touches and experiences. Thus, there is a cumbersome problem in terms of the maintenance works that the operators are required to fix the plunger by disengaging the ratchet as readily as possible.

Then, because the plunger 514 and the piston 526 are composed of the columnar members in the prior art tensioner 500 as described above, an excessive detent condition is produced due to the engagement between the rack 538 of the plunger 514 and the engagement teeth 536 of the piston 526 to vibration of the plunger 514 in driving the engine and the engagement teeth 536 of the piston 526 are liable to be chipped. Thus, there is a problem in terms of durability that by causing a twist across an entire tooth width range, mismatch of the engagement, and erroneous operations of the ratchet mechanism composed of the engagement teeth 536 and the rack 538.

Still further, because the engagement teeth 536 and plunger retract blocking tooth surfaces of the rack 538 are formed by tooth surfaces orthogonal to an advance/retract direction of the plunger 514 in the prior art tensioner 500 as described above, this configuration restricts even moves in the retract direction of the plunger 514. Then, there are other problems that the plunger 514 possibly causes seizure and that the chain travels with excessive tension, thus increasing a load to the chain and noise of engine sound.

Accordingly, the present invention aims to solve the prior art problems by providing a ratchet-type tensioner that enables to readily disengage a plunger from a ratchet element in attaching the tensioner within an engine or in maintaining the engine, that engages the plunger reliably with the ratchet element in operating the engine, that reduces flapping noise by suppressing backlash to reaction force of the plunger receiving from a timing chain in starting the engine after leaving for a long period of time, and that prevents seizure of the plunger by permitting moves in a retract direction of the plunger caused by excessive tension of the chain after starting the engine.

Means for Solving the Problems

According to Claim 1 of the invention, the aforementioned problem is solved by providing a ratchet-type tensioner including a housing body provided with an oil supplying passage of external pressure oil, a plunger accommodating hole formed in the housing body, a plunger that projects slidably out of the plunger accommodating hole, a high-pressure oil chamber formed between the plunger accommodating hole of the housing body and a hollow portion of the plunger, a plunger biasing spring accommodated within the high-pressure oil chamber and biasing the plunger in the projecting direction, a columnar ratchet element fittingly inserted in a cylindrical ratchet accommodating hole formed in the housing body and sliding in a direction orthogonal to an advance/retract direction of the plunger, a ratchet biasing spring that biases the ratchet element such that ratchet teeth provided in a plunger-side edge region of the ratchet element engage with rack teeth engraved on a side surface of the plunger, and a spring anchoring plug fitted in the vicinity of a rear end of the ratchet accommodating hole and seating the ratchet biasing spring, characterized in that a ratchet releasing mechanism configured to disengage the ratchet teeth of the ratchet element from the rack teeth of the plunger by means of a tool pin includes a ratchet releasing pin guide hole formed through the housing body to insert a pin edge portion of the tool pin toward a plunger-side edge region of the ratchet element, and a ratchet releasing pin engaging hole formed in the plunger-side edge region of the ratchet element to guide and engage with the pin edge portion of the tool pin inserted through the ratchet releasing pin guide hole.

According to Claim 2 of the invention, in addition to the configuration of the invention of Claim 1, the aforementioned problem is solved by constructing such that the ratchet releasing pin guide hole of the housing body is formed into a shape of a funnel such that its diameter is contracted from an outer surface of the housing body toward the ratchet releasing pin engaging hole of the ratchet element, and the ratchet releasing pin engaging hole in the ratchet element is formed into a shape of a funnel such that its diameter is contracted from an outer circumferential surface of the ratchet element toward a ratchet center axis along the sliding direction of the ratchet element.

According to Claim 3 of the invention, in addition to the configuration of the invention of Claim 1 or 2, the ratchet releasing pin engaging hole of the ratchet element is provided in the plunger side edge region of the ratchet element by being shifted away from the ratchet releasing pin guide hole of the housing body by more than a dimension of a tooth depth of the ratchet teeth in the condition in which the rack teeth of the plunger are engaged with the ratchet teeth of the ratchet element.

According to Claim 4 of the invention, in addition to the configuration of the invention of any one of Claims 1 through 3, the aforementioned problem is solved by constructing such that the ratchet-type tension further includes a plunger stopping mechanism for temporarily stopping the plunger from projecting out of the housing body by means of the tool pin, wherein the plunger stopping mechanism includes a plunger stopping pin insertion hole, formed through the housing body, for inserting the pin edge portion of the tool pin into a plunger projection end region of the plunger, and a plunger stopping pin locking groove formed in the plunger projection end region of the plunger for locking the tool pin inserted from the plunger stopping pin insertion hole.

According to Claim 5 of the invention, in addition to the configuration of the invention of Claim 4, the aforementioned problem is solved by constructing such that the ratchet-type tensioner further includes a tool pin guide groove formed on the housing body to guide the pin edge portion of the tool pin from the ratchet releasing pin guide hole to the plunger stopping pin insertion hole in a slidable contact condition.

According to Claim 6 of the invention, in addition to the configuration of the invention of Claim 5, the aforementioned problem is solved by forming the tool pin guide groove such that a width thereof is contracted from the ratchet releasing pin guide hole toward the plunger stopping pin insertion hole.

According to Claim 7 of the invention, in addition to the configuration of the invention of any one of Claims 1 through 6, the aforementioned problem is solved by constructing such that a biasing force of a ratchet biasing spring is set to be greater than a component force in the sliding direction generated by a reaction force that acts from the traveling chain side so as to retract the plunger in starting the engine, and to be smaller than a component force in the sliding direction generated by a reaction force that acts from the traveling chain side so as to retract the plunger when the tension of the chain is excessive after starting the engine.

According to Claim 8 of the invention, in addition to the configuration of the invention of any one of Claims 1 through 7, the aforementioned problem is solved by forming the rack teeth of the plunger concavo-convexly respectively by the stop surfaces inclined toward the plunger advance side with respect to the sliding direction of the ratchet element and by sliding surfaces inclined toward the plunger retract side with respect to the sliding direction of the ratchet element, and by forming the ratchet teeth of the ratchet element concavo-convexly respectively by stop counter surfaces inclined toward the plunger advance side with respect to the sliding direction of the ratchet element and by counter surfaces inclined toward the plunger retraction side with respect to the sliding direction of the ratchet element.

According to Claim 9 of the invention, in addition of the configuration of the invention of Claim 8, the aforementioned problem is solved by constructing such that an inclination angle of the stop surface is set to be smaller than an inclination angle of the sliding surface.

According to Claim 10 of the invention, in addition to the configuration of the invention of any one of Claims 1 through 9, the aforementioned problem is solved by constructing such that the ratchet element has a ratchet whole length longer than a ratchet outer diameter.

According to Claim 11 of the invention, in addition to the configuration of the invention of any one of Claims 1 through 10, the aforementioned problem is solved by constructing such that the ratchet biasing spring is inserted into a spring accommodating hole of the ratchet element along the sliding direction.

Advantage Effects of the Invention

Then, because the ratchet-type tensioner includes the housing body provided with the oil supplying passage of external pressure oil, the plunger accommodating hole formed in the housing body, the plunger that projects slidably out of the plunger accommodating hole, the high-pressure oil chamber formed between the plunger accommodating hole of the housing body and the hollow portion of the plunger, the plunger biasing spring accommodated within the high-pressure oil chamber and biasing the plunger in the projecting direction, the columnar ratchet element fittingly inserted in the cylindrical ratchet accommodating hole formed in the housing body and sliding in the direction orthogonal to the advance/retract direction of the plunger, the ratchet biasing spring that biases the ratchet element such that ratchet teeth provided in the plunger-side edge region of the ratchet element engage with the rack teeth engraved on the side surface of the plunger, and the spring anchoring plug fitted in the vicinity of the rear end of the ratchet accommodating hole and seating the ratchet biasing spring, it is not only possible to apply tension to the timing chain within the engine from the plunger of the ratchet-type tensioner, but also to bring about the following advantageous effects peculiar to the present invention.

That is, according to the ratchet-type tension of Claim 1 of the invention, the ratchet releasing mechanism configured to disengage the ratchet teeth of the ratchet element from the rack teeth of the plunger by means of the tool pin includes the ratchet releasing pin guide hole formed through the housing body to insert the pin edge portion of the tool pin toward the plunger-side edge region of the ratchet element, and the ratchet releasing pin engaging hole formed in the plunger-side edge region of the ratchet element to guide and engage with the pin edge portion of the tool pin inserted through the ratchet releasing pin guide hole, so that the pin edge portion of the tool pin inserted through the ratchet releasing pin guide hole is guided and engaged with the ratchet releasing pin engaging hole and it is possible to reliably disengage the ratchet teeth of the ratchet element from the rack teeth of the plunger and to push back and retract the plunger. Accordingly, it is possible to remarkably reduce a workload of maintenance works such as positioning and replacing parts of the ratchet-type tensioner and the timing chain in a condition of loosening the timing chain.

According to the ratchet-type tensioner of the invention of Claim 2, in addition to the effect brought about by the invention of Claim 1, the ratchet releasing pin guide hole of the housing body is formed into the shape of the funnel such that its diameter is contracted from the outer surface of the housing body toward the ratchet releasing pin engaging hole of the ratchet element, and the ratchet releasing pin engaging hole in the ratchet element is formed into the shape of the funnel such that its diameter is contracted from the outer circumferential surface of the ratchet element toward the ratchet center axis along the sliding direction of the ratchet element, so that, in a case of disengaging the ratchet element from the plunger by the tool pin, the pin edge portion of the tool pin comes into slidable contact with and is guided along the ratchet releasing pin guide hole whose diameter is reduced like the funnel from the outer surface of the housing body. Then, after reaching the ratchet releasing pin engaging hole, the pin edge portion of the tool pin is positioned by being in slidable contact with the ratchet releasing pin engaging hole whose diameter is also reduced like the funnel, and is inserted toward the ratchet center axis of the ratchet element.

Accordingly, even if spaces around a maintenance hole provided through an engine cover that covers an engine block wall are narrow in carrying out the maintenance works such as positioning and replacing parts of the ratchet-type tensioner and the timing chain by loosening the timing chain, it is possible to readily disengage the ratchet teeth of the ratchet element from the rack teeth of the plunger by reliably engaging the pin edge portion of the tool pin from the ratchet releasing pin guide hole to the ratchet releasing pin engaging hole.

According to the ratchet-type tensioner of the invention of Claim 3, in addition to the effect brought about by the invention of Claim 1 or 2, the ratchet releasing pin engaging hole of the ratchet element is provided in the plunger side edge region of the ratchet element by being shifted away from the ratchet releasing pin guide hole of the housing body by more than the dimension of the tooth depth of the ratchet teeth in the condition in which the rack teeth of the plunger are engaged with the ratchet teeth of the ratchet element, so that, in a case of disengaging the ratchet element from the plunger by the tool pin, the pin edge portion of the tool pin inserted from the ratchet releasing pin guide hole separates the ratchet teeth of the ratchet element from the rack teeth of the plunger by more than the dimension of the tooth depth through the ratchet releasing pin engaging hole. Accordingly, it is possible to reliably release the engagement of the ratchet teeth of the ratchet element from the rack teeth of the plunger.

According to the ratchet-type tensioner of the invention of Claim 4, in addition to the effect brought about by the invention of any one of Claims 1 through 3, the ratchet-type tensioner further includes the plunger stopping mechanism for temporarily stopping the plunger from projecting out of the housing body by means of the tool pin, and the plunger stopping mechanism includes the plunger stopping pin insertion hole, formed through the housing body, for inserting the pin edge portion of the tool pin into the plunger projection end region of the plunger, and the plunger stopping pin locking groove formed in the plunger projection end region of the plunger for locking the tool pin inserted from the plunger stopping pin insertion hole, so that the pin edge portion of the tool pin can be inserted from the plunger stopping pin insertion hole to the plunger projection end region of the plunger and engages with the plunger stopping pin locking groove in a condition in which the plunger is pushed into the plunger accommodating hole of the housing body.

Accordingly, it is possible to temporarily stop the plunger from projecting out of the housing body and to remarkably reduce the workload of the maintenance works such as positioning and replacing parts of the ratchet-type tensioner and the timing chain in mounting the tensioner within the engine or in maintaining the engine.

According to the ratchet-type tensioner of the invention of Claim 5, in addition to the effect brought about by the invention of Claim 4, the ratchet-type tensioner further includes the tool pin guide groove formed on the housing body to guide the pin edge portion of the tool pin from the ratchet releasing pin guide hole to the plunger stopping pin insertion hole in the slidable contact condition, so that, in a case of temporarily stopping the plunger from projecting out of the housing body by the tool pin in a condition in which the plunger is retracted by disengaging the ratchet teeth of the ratchet element from the rack teeth of the plunger, the pin edge portion of the tool pin pulled out of the ratchet releasing pin guide hole can be guided to the plunger stopping pin insertion hole in the slidable contact state, while following a sense of contact of the operator, by the tool pin guide groove provided so as to connect the ratchet releasing pin guide hole with the plunger stopping pin insertion hole.

Accordingly, even if the spaces around the maintenance hole provided through the engine cover that covers the engine block wall are invisible in carrying out the maintenance works such as positioning and replacing parts of the ratchet-type tensioner and the timing chain by loosening the timing chain, it is possible to reliably insert the pin edge portion of the tool pin from the ratchet releasing pin guide hole to the plunger stopping pin inserting hole.

According to the ratchet-type tensioner of the invention of Claim 6, in addition to the effect brought about by the invention of Claim 5, the tool pin guide groove is formed such that the width thereof is contracted from the ratchet releasing pin guide hole toward the plunger stopping pin insertion hole, so that, in the case of temporarily stopping the plunger from projecting out of the housing body by the tool pin in the condition in which the plunger is retracted by disengaging the ratchet teeth of the ratchet element from the rack teeth of the plunger, even if the pin edge portion of the tool pin pulled out of the ratchet releasing pin guide hole is misaligned, the pin edge portion of the tool pin can be gradually positioned and guided to the plunger stopping pin insertion hole by following the tool pin guide groove provided so as to connect the ratchet releasing pin guide hole with the plunger stopping pin insertion hole.

Accordingly, even if the spaces around the maintenance hole provided through the engine cover that covers the engine block wall are narrow and invisible in carrying out the maintenance works such as positioning and replacing parts of the ratchet-type tensioner and the timing chain by loosening the timing chain, it is possible to readily and more reliably insert the pin edge portion of the tool pin from the ratchet releasing pin guide hole to the plunger stopping pin inserting hole.

According to the ratchet-type tensioner of the invention of Claim 7, in addition to the effect brought about the invention of any one of Claims 1 through 6, because the biasing force of the ratchet biasing spring is set to be greater than the component force in the sliding direction generated by the reaction force that acts from the traveling chain side so as to retract the plunger in starting the engine, a biasing force of the ratchet biasing spring acts on the ratchet teeth of the ratchet element so as to engage with the rack teeth of the plunger when the reaction force that retracts the plunger is generated in starting the engine.

Accordingly, it is not only possible to reduce flapping noise of the timing chain by blocking the retract displacement by restricting moves in the retract direction of the plunger causing backlash, but also to downsize the tensioner itself by reducing a number of parts and manufacturing costs without requiring no special high-load accommodating plunger biasing spring 160, orifice mechanism nor oil-reserve mechanism, because the plunger biasing force is sufficient only by the biasing force that just biases and projects the plunger.

Still more, because the biasing force of the ratchet biasing spring is set to be smaller than a component force in the sliding direction of the ratchet element generated by a reaction force that acts from the traveling chain side so as to retract the plunger when the tension of the chain is excessive after starting the engine, the biasing force of the ratchet biasing spring acts on the ratchet teeth of the ratchet element when the reaction force that retracts the plunger is generated when the tension is excessive. Then, the ratchet teeth of the ratchet element are disengaged from the rack teeth of the plunger and the plunger is retracted until when the biasing force of the ratchet biasing spring becomes greater than the component force in the sliding direction of the ratchet element.

Accordingly, it is not only possible to prevent seizure of the plunger by allowing the retract displacement of the plunger without restricting the move in the retract direction of the plunger causing a backlash by advancing excessively due to temperature change of the engine and others, but also possible to securely prevent the seizure of the plunger because the disengagement timing caused by the excessive tension can be adjusted by adjusting the biasing force of this ratchet biasing spring.

According to the ratchet-type tensioner of the invention of Claim 8, in addition to the effect brought about by the invention of any one of Claims 1 through 7, the rack teeth of the plunger are formed concavo-convexly respectively by the stop surfaces inclined toward the plunger advance side with respect to the sliding direction of the ratchet element and the sliding surfaces inclined toward the plunger retract side with respect to the sliding direction of the ratchet element, and the ratchet teeth of the ratchet element are formed concavo-convexly respectively by the stop counter surfaces inclined toward the plunger advance side with respect to the sliding direction of the ratchet element and the counter surfaces inclined toward the plunger retraction side with respect to the sliding direction of the ratchet element.

Therefore, when a reaction force that retracts the plunger is generated due to excessive tension of the chain after starting the engine, the reaction force acts on the stop counter surfaces of the ratchet element as a component force through the stop surfaces on the plunder side. The component force that acts on the stop counter surfaces of the ratchet element acts further as a smaller component force in the sliding direction of the ratchet element so as to disengage the ratchet teeth of the ratchet element from the rack teeth of the plunger. Then, the rack teeth of the plunger slidably move over the sliding counter surface through the stop counter surface of the ratchet element and return by one tooth.

Accordingly, it becomes possible to smoothly allow the retract displacement of the plunger without restricting the move in the retract direction of the plunger while preventing wear and damage such as chipping of the teeth that is prone to occur in the ratchet teeth and the rack teeth when the chain tension is excessive after starting the engine, and to exhibit excellent durability by avoiding excessive impact on the ratchet biasing spring.

According to the ratchet-type tensioner of the invention of Claim 9, in addition to the effect brought about by the invention of Claim 8, because the inclination angle of the stop surface is formed to be smaller than the inclination angle of the sliding surface, it is possible to block the rack teeth of the plunger from disengaging from the ratchet teeth of the ratchet element even if the reaction force that retracts the plunger is generated in starting the engine.

Accordingly, it is possible to block the retract displacement of the plunger by restricting the move in the retract direction of the plunger that has caused a backlash in starting the engine.

According to the ratchet-type tensioner of the invention of Claim 10, in addition to the effect brought about by the invention of any one of Claims 1 through 9, because the ratchet element has the ratchet whole length longer than the ratchet outer diameter, it is possible to suppress an inclination the ratchet element, liable to occur in the sliding direction within the ratchet accommodating hole, and to prevent uneven wear of the ratchet element. Accordingly, it is possible to smoothly operate the ratchet mechanism composed of the plunger and the ratchet element even if an excessive load is applied to the ratchet element.

According to the ratchet-type tensioner of the invention of Claim 11, in addition to the effect brought about by the invention of any one of Claims 1 through 11, because the ratchet biasing spring is inserted into the spring accommodating hole of the ratchet element along the sliding direction, the ratchet biasing spring is put into a state in which the ratchet biasing spring is substantially inserted within the spring accommodating hole. Accordingly, as compared to a case when the ratchet biasing spring is fitted around an outer circumferential surface of the ratchet element, it is possible to simplify a configuration for attaching the ratchet element to the ratchet accommodating hole and to downsize the ratchet element.

BRIEF DESCRIPTION OF DRAWINGS

FIG. 6a is a perspective view showing a state in which a tool pin is inserted into a ratchet releasing pin guide hole of the ratchet releasing mechanism, and FIG. 6b is a section view of a main part thereof.

FIG. 7a is a perspective view showing a state in which the tool pin is inserted into the ratchet releasing pin engaging hole through the ratchet releasing pin guide hole of the ratchet releasing mechanism, and FIG. 7b is a section view of a main part thereof.

FIG. 8a is a perspective view showing a state in which the tool pin is engaged with the ratchet releasing pin engaging hole of the ratchet releasing mechanism, and FIG. 8b is a section view of a main part thereof.

FIG. 9a is a perspective view showing a state in which the tool pin to be moved to a plunger stopping mechanism is pulled out of the ratchet releasing pin guide hole of the ratchet releasing mechanism, and FIG. 9b is a section view of a main part thereof.

FIG. 10a is a perspective view showing a state in which the tool pin is shifted to the ratchet releasing pin engaging hole through the ratchet releasing pin guide hole of the ratchet releasing mechanism, and FIG. 10b is a section view of a main part thereof.

PREFERRED EMBODIMENT OF THE INVENTION

Figure 1:
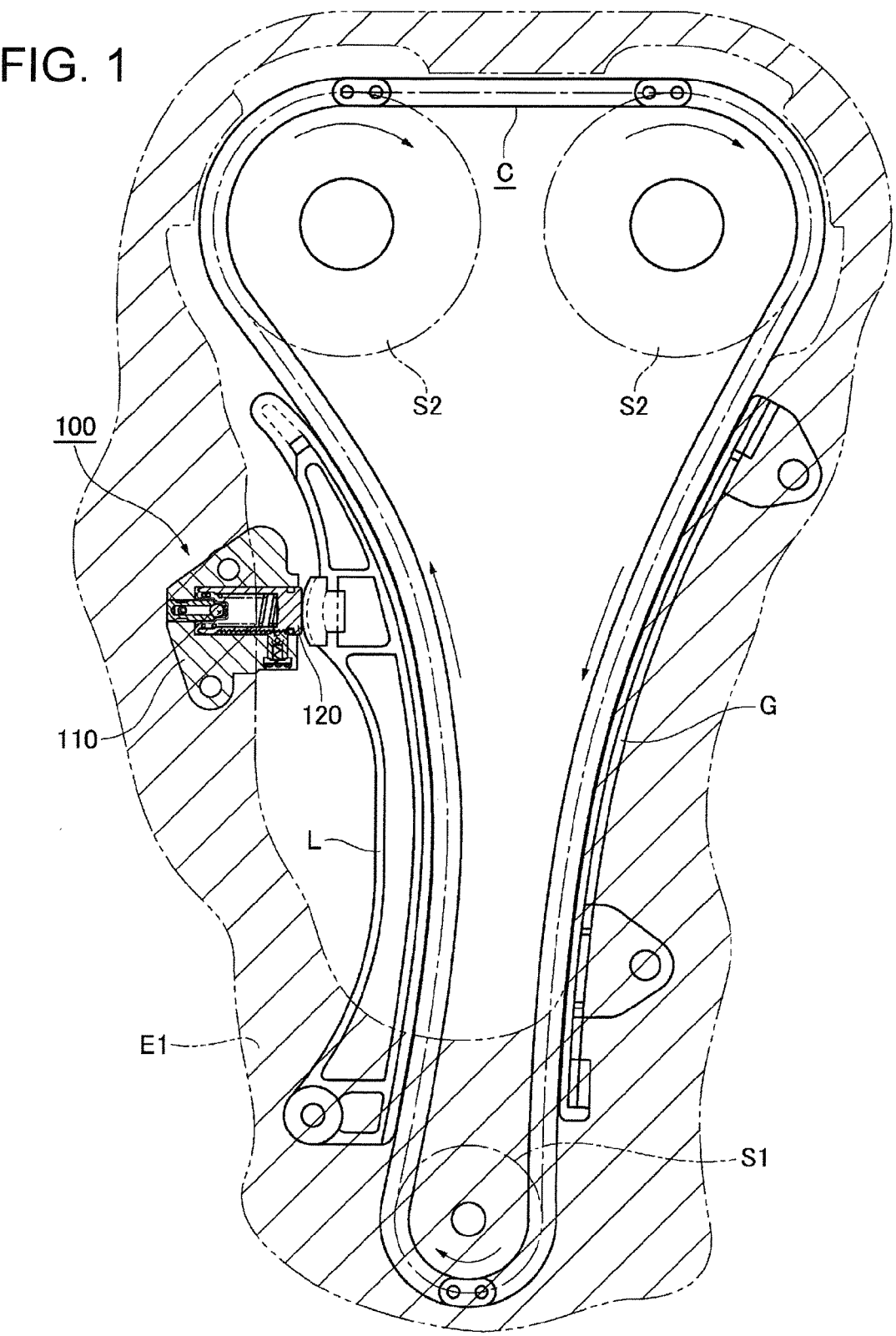
FIG. 1 illustrates a mode of use of a ratchet-type tensioner according to one embodiment of the invention.

A ratchet-type tensioner of the present invention may be configured specifically in any manner as long as the ratchet-type tensioner includes a housing body provided with an oil supplying passage of external pressure oil, a plunger accommodating hole formed in the housing body, a plunger that projects slidably out of the plunger accommodating hole, a high-pressure oil chamber formed between the plunger accommodating hole of the housing body and a hollow portion of the plunger, a plunger biasing spring accommodated within the high-pressure oil chamber and biasing the plunger in the projecting direction, a columnar ratchet element fittingly inserted in a cylindrical ratchet accommodating hole formed in the housing body and sliding in a direction orthogonal to an advance/retract direction of the plunger, a ratchet biasing spring that biases the ratchet element such that ratchet teeth provided in a plunger-side edge region of the ratchet element engage with rack teeth engraved on a side surface of the plunger, and a spring anchoring plug fitted in the vicinity of a rear end of the ratchet accommodating hole and seating the ratchet biasing spring, and is characterized in that a ratchet releasing mechanism configured to disengage the ratchet teeth of the ratchet element from the rack teeth of the plunger by means of a tool pin includes a ratchet releasing pin guide hole formed through the housing body to insert a pin edge portion of the tool pin toward a plunger-side edge region of the ratchet element, and a ratchet releasing pin engaging hole formed in the plunger-side edge region of the ratchet element to guide and engage with the pin edge portion of the tool pin inserted through the ratchet releasing pin guide hole.

Then, the ratchet-type tensioner enables to readily disengage the plunger from the ratchet element in attaching the tensioner within the engine or in maintaining the engine, that engages the plunger reliably with the ratchet element in operating the engine, that reduces flapping noise by suppressing backlash to reaction force of the plunger receiving from a timing chain in starting the engine after leaving for a long period of time, and that prevents seizure of the plunger by permitting moves in a retract direction of the plunger caused by excessive tension of the chain after starting the engine.

For instance, the fundamental configuration of the housing body in the ratchet-type tensioner of the invention may be either one of what introduces pressure oil supplied from an oil pump directly to an oil supplying passage formed in the housing body and what is provided with an oil reservoir for once reserving pressure oil supplied from an oil pump concavely on a back of the housing body before introducing into an oil supplying passage formed in the housing body.

Still further, the ratchet-type tensioner of the invention may be either one of what is provided with a check valve unit that blocks the pressure oil from flowing back from a high pressure oil chamber to the oil supplying passage and that is built in or not built in a bottom portion of a plunger accommodating hole.

Still further, a specific unit configuration of the ratchet-type tensioner having the check valve unit described above may have any configuration as long as the check valve unit is built in the bottom portion of the plunger accommodating hole and that blocks the pressure oil from flowing back from the high pressure oil chamber to the oil supplying passage. For instance, the check valve unit may include a ball seat communicating to the oil supplying passage to supply pressure oil to the high pressure oil chamber side, a check ball that seats on a valve seat of the ball seat, a ball biasing spring that biases and presses the check ball to the ball seat, and a bell-like retainer that restricts a movement of the check ball.

Then, a biasing force of the ratchet biasing spring used in the ratchet-type tensioner of the invention may be a biasing force having any absolute value as long as it is set to be greater than a component force in the sliding direction of the ratchet element generated by a reaction force that acts from the traveling chain side so as to retract the plunger in starting the engine, and to be smaller than a component force in the sliding direction of the ratchet element generated by a reaction force that acts so as to retract the plunger when a tension of the chain is excessive after starting the engine. It is more preferable to set the biasing force by considering a coefficient of friction between the rack teeth of the plunger and the ratchet teeth of the ratchet element.

Still further, a specific inner circumferential configuration of a ratchet releasing pin guide hole provided through the housing body of the embodiment may be any one of an inverse conical inner circumferential surface, an inverse domed inner circumferential surface, a mortar-type inner circumferential surface and a trumpet-type inner circumferential surface, as long as a pin edge portion of the tool pin is inserted into a ratchet releasing tool pin engaging hole provided in a plunger-side edge region of the ratchet element.

A specific inner circumferential configuration of a plunger stopping pin inserting hole composing a plunger stopping mechanism may be one as long as it has a cylindrical inner circumferential surface having a substantially equal diameter with the tool pin or having a slightly larger inner diameter so that the tool pin can be smoothly inserted.

A specific configuration of a plunger stopping pin locking groove formed in the plunger used in the embodiment may be any one of a ringed groove formed around the whole circumference of a plunger projection end region of the plunger and a cutaway groove which is formed in a partial circumference of the plunger projection end region, as long as the plunger stopping pin locking groove temporarily stops the plunger from projecting out of the housing body by engaging with the pin edge portion of the tool pin inserted from the plunger stopping pin inserting hole in a condition in which the plunger is pushed into the plunger accommodating hole of the housing body.

A specific configuration of the ratchet teeth of the ratchet element used in the embodiment may be what the several ratchet teeth that engage with the rack teeth engraved on a side surface of the plunger without twisting across the whole tooth widthwise region are provided in the plunger-side edge region of the ratchet element.

For instance, the specific configuration of the ratchet teeth are preferable to be one having two or more ratchet teeth having teeth intervals with an equal pitch and having the equal tooth depth, because they can engage with the rack teeth on the side surface of the plunger while equally dispersing loads of engagement.

Still further, a specific inner circumferential configuration of a ratchet releasing tool pin engaging hole provided in the plunger-side edge region of the ratchet element may be any type, such as an inverse conical inner circumferential surface, an inverse domed inner circumferential surface, a mortar-type inner circumferential surface and a trumpet-type inner circumferential surface, as long as it is formed such that a diameter thereof is contracted like a funnel from an outer circumferential surface of the ratchet element toward a ratchet center axis along the sliding direction of the ratchet element and such that the pin edge portion of the tool pin is slidably guided from the outer surface of the housing body along the ratchet releasing pin guide hole and reaches the ratchet releasing tool pin engaging hole in releasing the engagement of the plunger with the ratchet element.

Still further, a specific installation position of the ratchet releasing tool pin engaging hole may be any position as long as the ratchet releasing tool pin engaging hole is provided in the plunger side edge region of the ratchet element by being shifted away from the ratchet releasing pin guide hole of the housing body by more than a dimension of a tooth depth of the ratchet teeth in the condition in which the rack teeth of the plunger are engaged with the ratchet teeth of the ratchet element so that the engagement of the ratchet teeth of the ratchet element with the rack teeth of the plunger is reliably released. In other words, it will do if a center line of the ratchet releasing tool pin engaging hole of the ratchet element is provided so as to lean toward the plunger-side front end of the ratchet element from a center line of the ratchet releasing pin guide hole of the housing body by at least the dimension of the tooth depth of the ratchet teeth in the condition in which the ratchet teeth of the ratchet element are engaged with the rack teeth of the plunger.

Then, in order to reliably release the engagement of the ratchet teeth of the ratchet element with the rack teeth of the plunger, it is more preferable to form such that an aperture of an housing-side opening of the ratchet releasing tool pin engaging hole is larger than an aperture of a ratchet-side opening of the ratchet releasing pin guide hole, and such that the housing-side opening of the ratchet releasing tool pin engaging hole includes the ratchet-side opening of the ratchet releasing pin guide hole in the condition in which the rack teeth of the plunger are engaged with the ratchet teeth of the ratchet element.

Embodiment

A ratchet-type tensioner 100 of one embodiment of the invention will now be described with reference to FIGS. 1 through 16.

Figure 2:
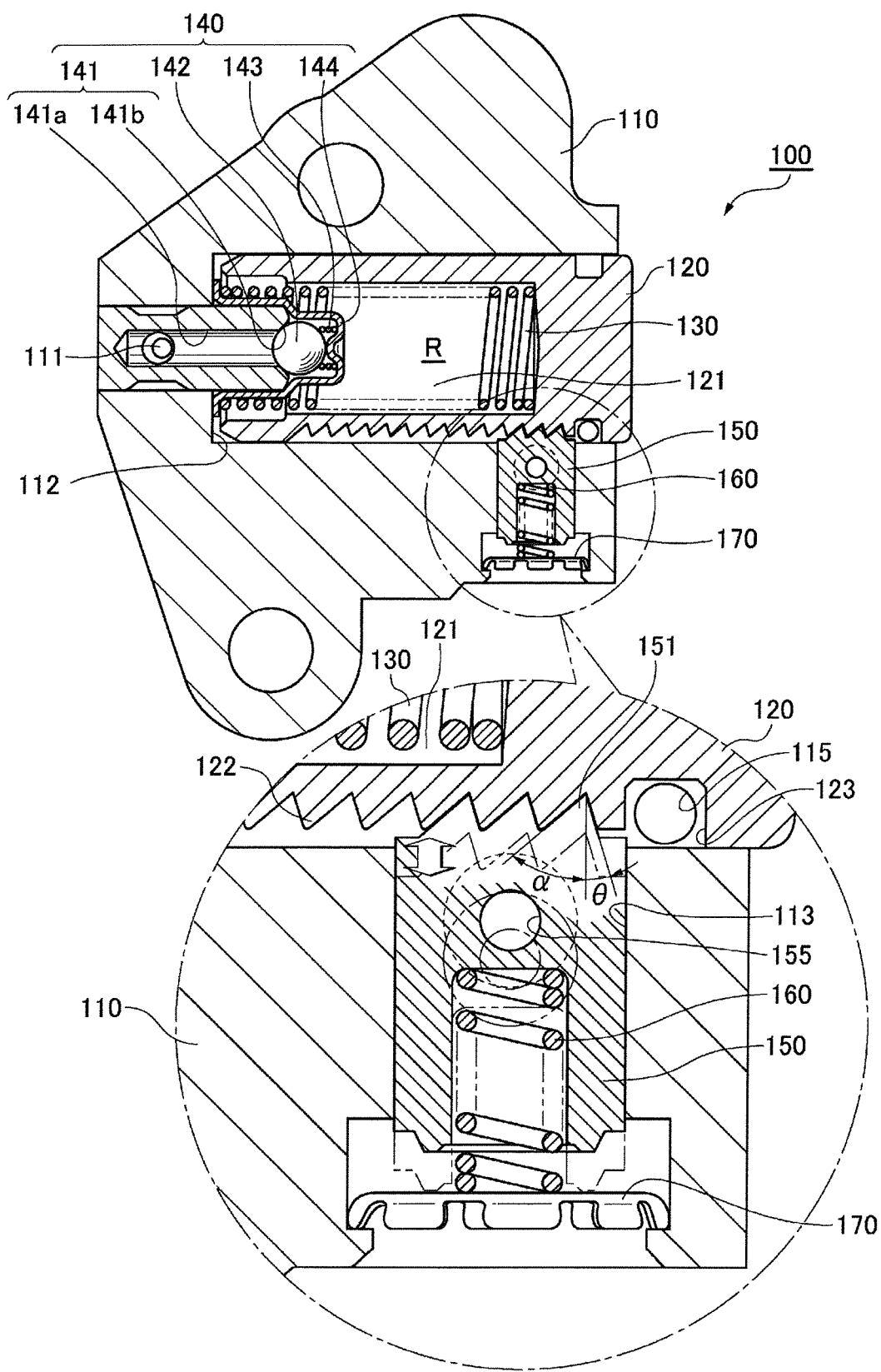
FIG. 2 is an enlarged view of a main part of the ratchet-type tensioner shown in FIG. 1.
Figure 3:
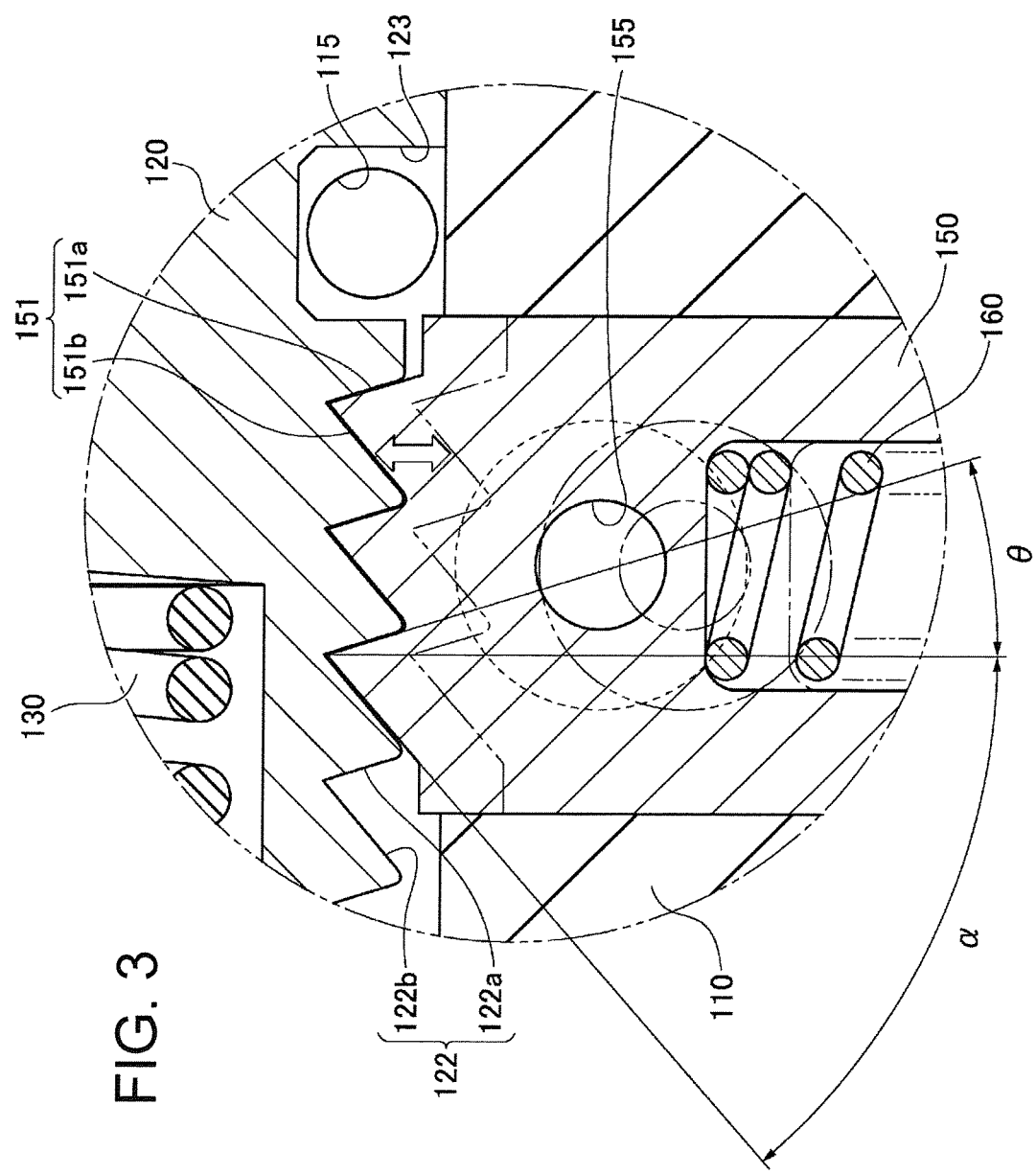
FIG. 3 is an enlarged view illustrating an engagement state of rack teeth with ratchet teeth.
Figure 4:
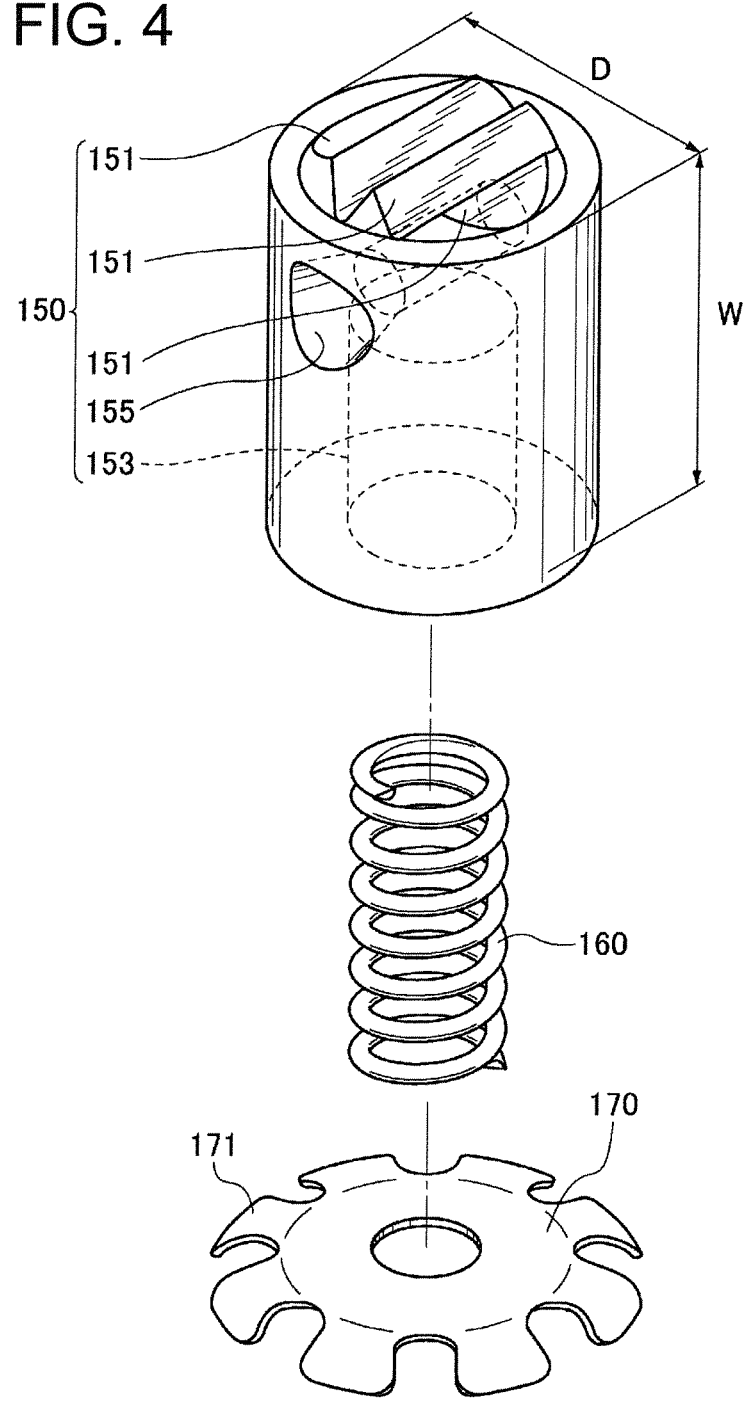
FIG. 4 is an exploded view of a ratchet, a ratchet biasing spring and a spring anchoring plug.
Figure 5:
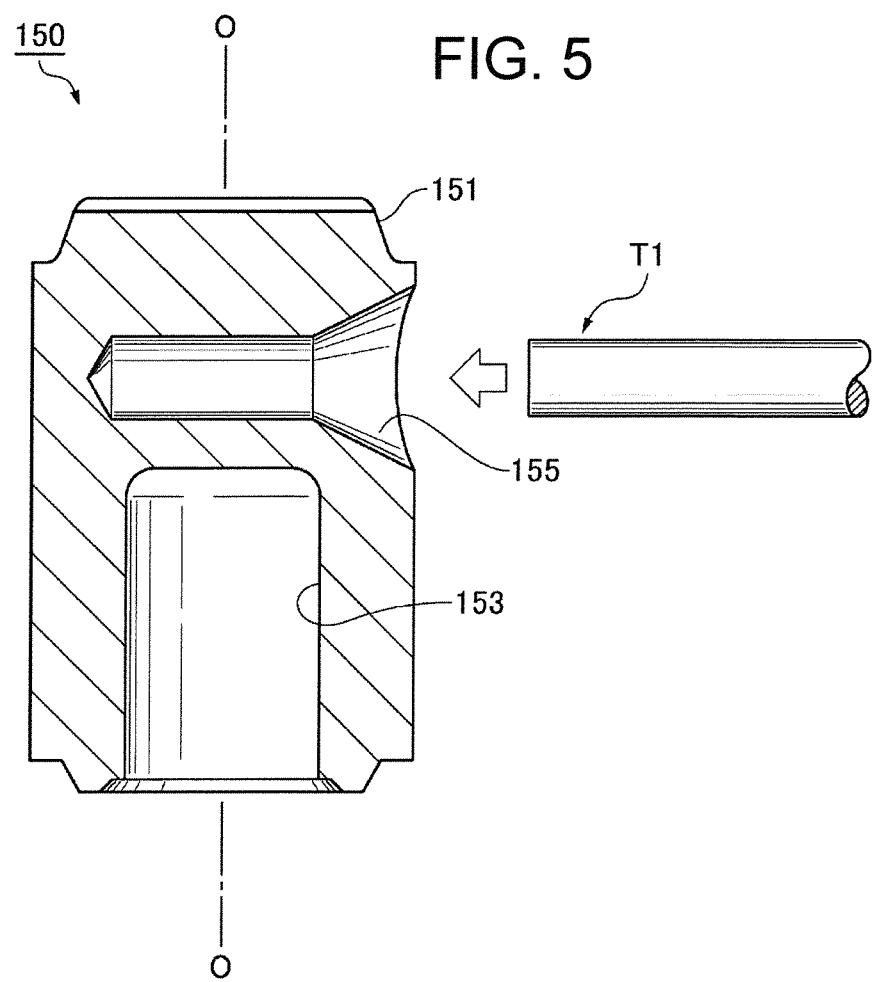
FIG. 5 is a section view of the ratchet having a ratchet releasing tool pin engaging hole.

Here, FIG. 1 illustrates a mode of use of a ratchet-type tensioner according to one embodiment of the invention, FIG. 2 is an enlarged section view of a main part of the ratchet-type tensioner 100 shown in FIG. 1, FIG. 3 is an enlarged view illustrating an engagement state of rack teeth with ratchet teeth, FIG. 4 is an exploded view of a ratchet, a ratchet biasing spring and a sp, and FIG. 5 is a section view of the ratchet having a ratchet releasing tool pin engaging hole.

FIGS. 6 through 11 illustrate a ratchet releasing mechanism and a plunger stopping mechanism. That is, FIG. 6a is a perspective view showing a state in which a tool pin is inserted into a ratchet releasing pin guide hole of the ratchet releasing mechanism and FIG. 6b is a section view of a main part thereof, FIG. 7a is a perspective view showing a state in which the tool pin is inserted into the ratchet releasing pin engaging hole through the ratchet releasing pin guide hole of the ratchet releasing mechanism and FIG. 7b is a section view of a main part thereof, FIG. 8a is a perspective view showing a state in which the tool pin is engaged with the ratchet releasing pin engaging hole of the ratchet releasing mechanism and FIG. 8b is a section view of a main part thereof, FIG. 9a is a perspective view showing a state in which the tool pin to be moved to a plunger stopping mechanism is pulled out of the ratchet releasing pin guide hole of the ratchet releasing mechanism and FIG. 9b is a section view of a main part thereof, FIG. 10a is a perspective view showing a state in which the tool pin is shifted to the ratchet releasing pin engaging hole through the ratchet releasing pin guide hole of the ratchet releasing mechanism and FIG. 10b is a section view of a main part thereof, and FIG. 11a is a perspective view showing a state in which the plunger is stopped from projecting out as the tool pin is locked to a plunger stopping pin locking groove through a plunger stopping pin insertion hole of the ratchet releasing mechanism and FIG. 11b is a section view of a main part thereof.

Figure 12:
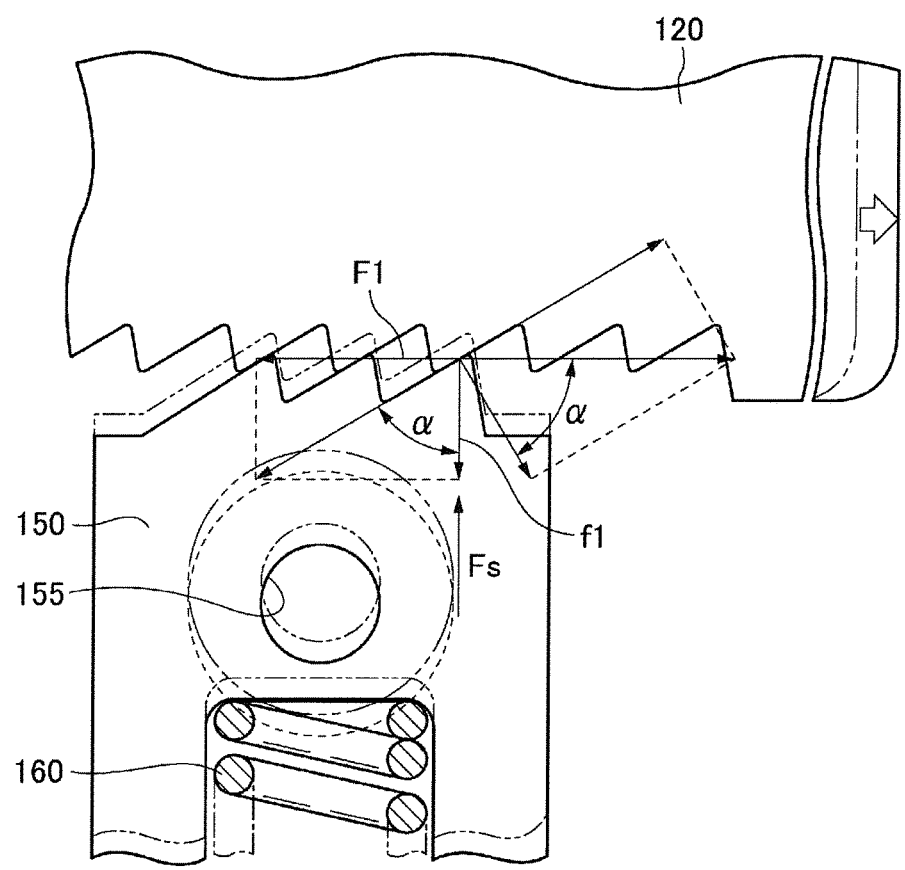
FIG. 12 is a diagram showing an engagement state of the rack teeth with the ratchet teeth associated when the plunger projects in starting an engine.
Figure 13:
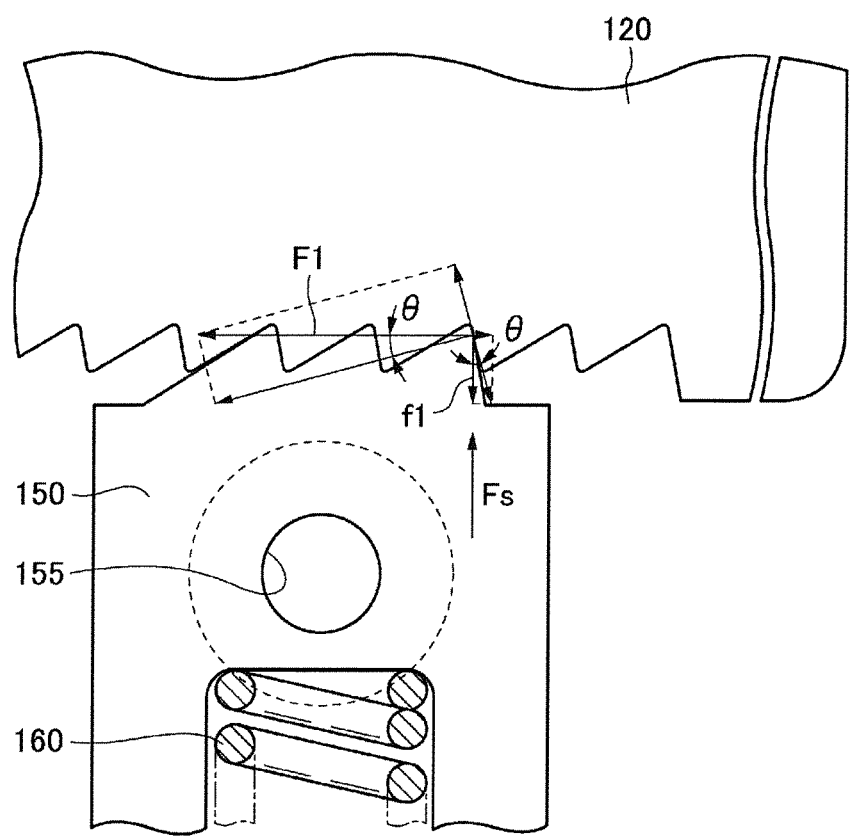
FIG. 13 is a diagram showing an engagement state of the rack teeth with the ratchet teeth associated when the plunger retracts in starting the engine.
Figure 14:
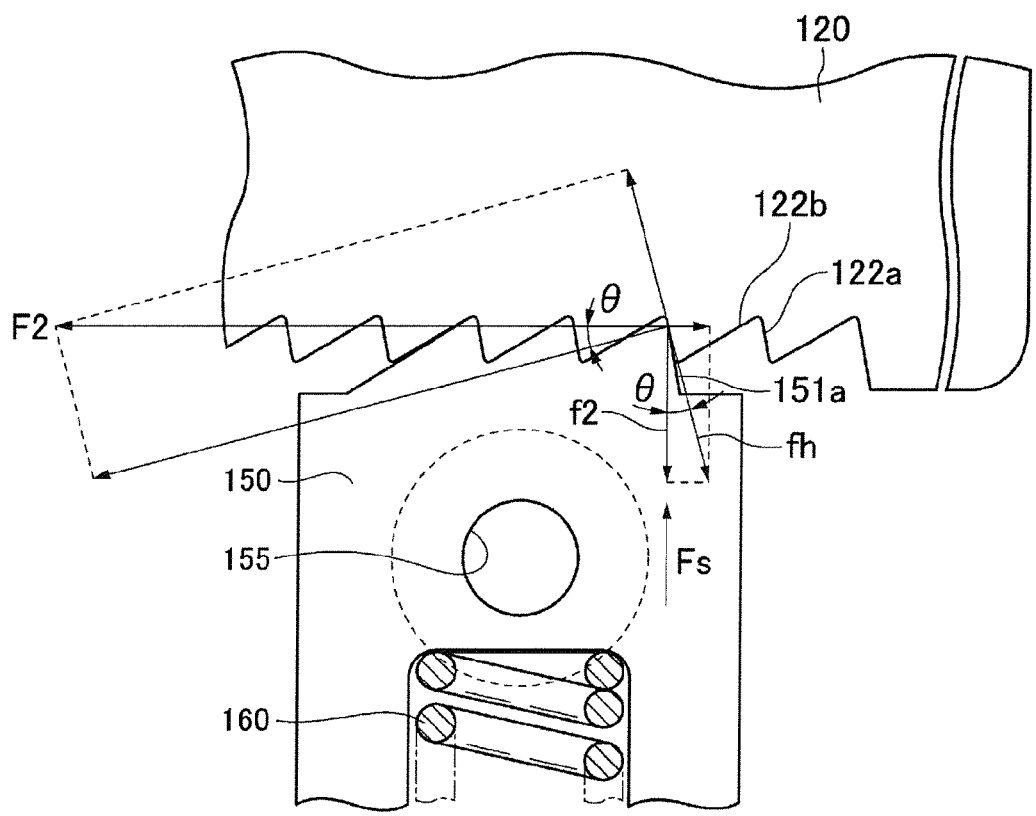
FIG. 14 is a diagram showing an engagement state of the rack teeth with the ratchet teeth associated when the plunger starts to retract due to excessive tension of the chain.
Figure 15:
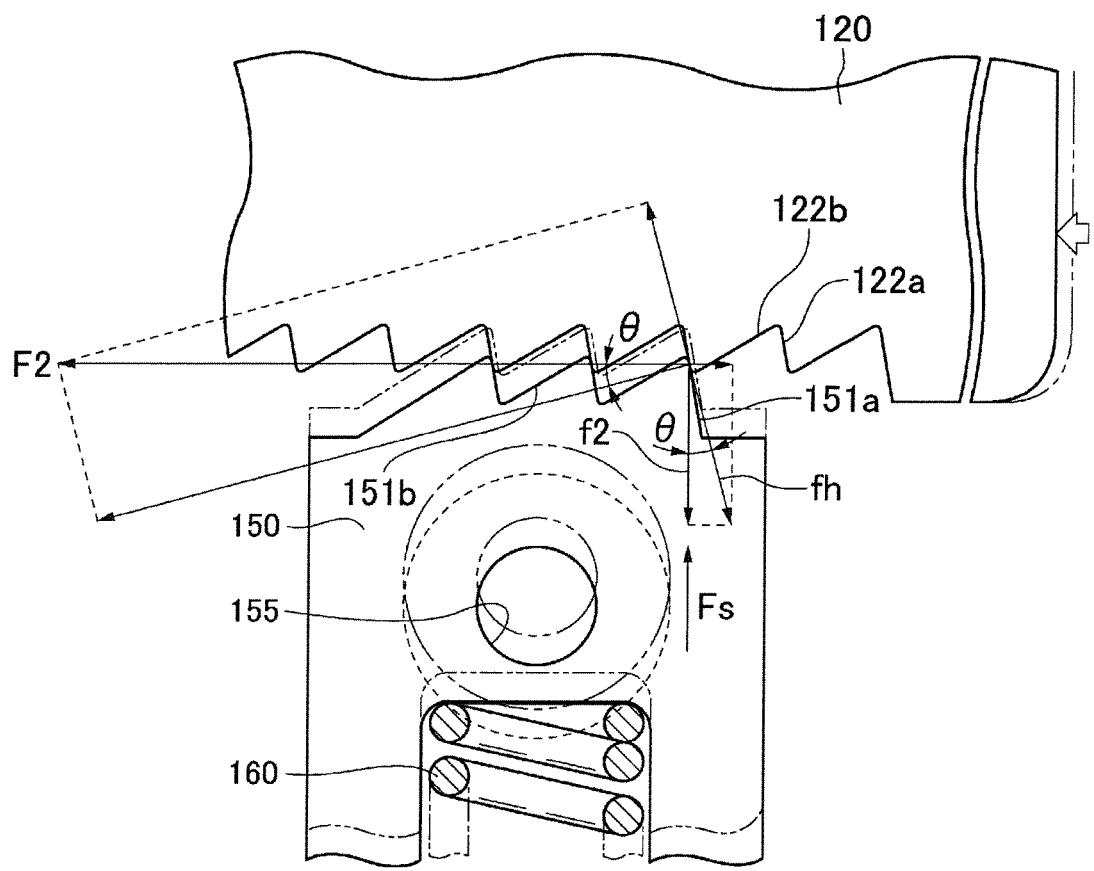
FIG. 15 is a diagram showing a disengagement state of the rack teeth with the ratchet teeth during when the plunger retracts due to the excessive tension of the chain.
Figure 16:
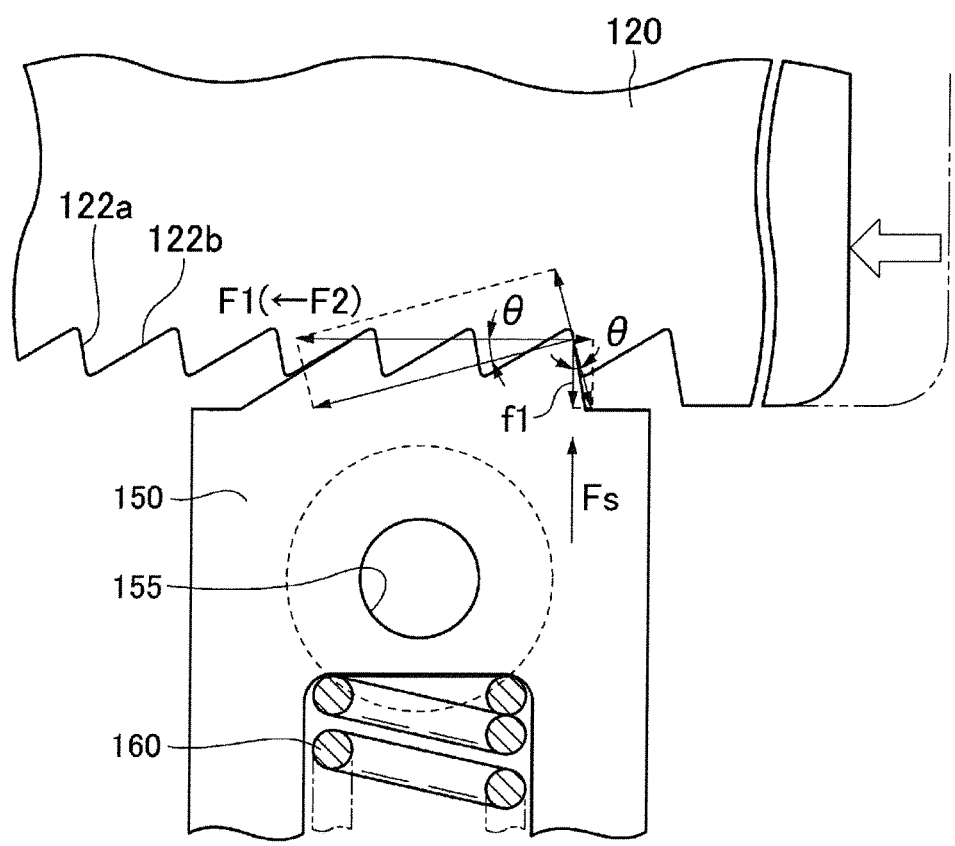
FIG. 16 is a diagram showing an engagement state of the rack teeth with the ratchet teeth associated when the plunger ends to retract due to the excessive tension of the chain.

FIGS. 12 through 16 illustrate operations of the plunger. That is, FIG. 12 is a diagram showing an engagement state of the rack teeth with the ratchet teeth associated when the plunger projects in starting an engine, FIG. 13 is a diagram showing an engagement state of the rack teeth with the ratchet teeth associated when the plunger retracts in starting the engine, FIG. 14 is a diagram showing an engagement state of the rack teeth with the ratchet teeth associated when the plunger starts to retract due to excessive tension of the chain, FIG. 15 is a diagram showing a disengagement state of the rack teeth with the ratchet teeth during when the plunger retracts due to the excessive tension of the chain, and FIG. 16 is a diagram showing an engagement state of the rack teeth with the ratchet teeth associated when the plunger ends to retract due to the excessive tension of the chain.

Figure 17:
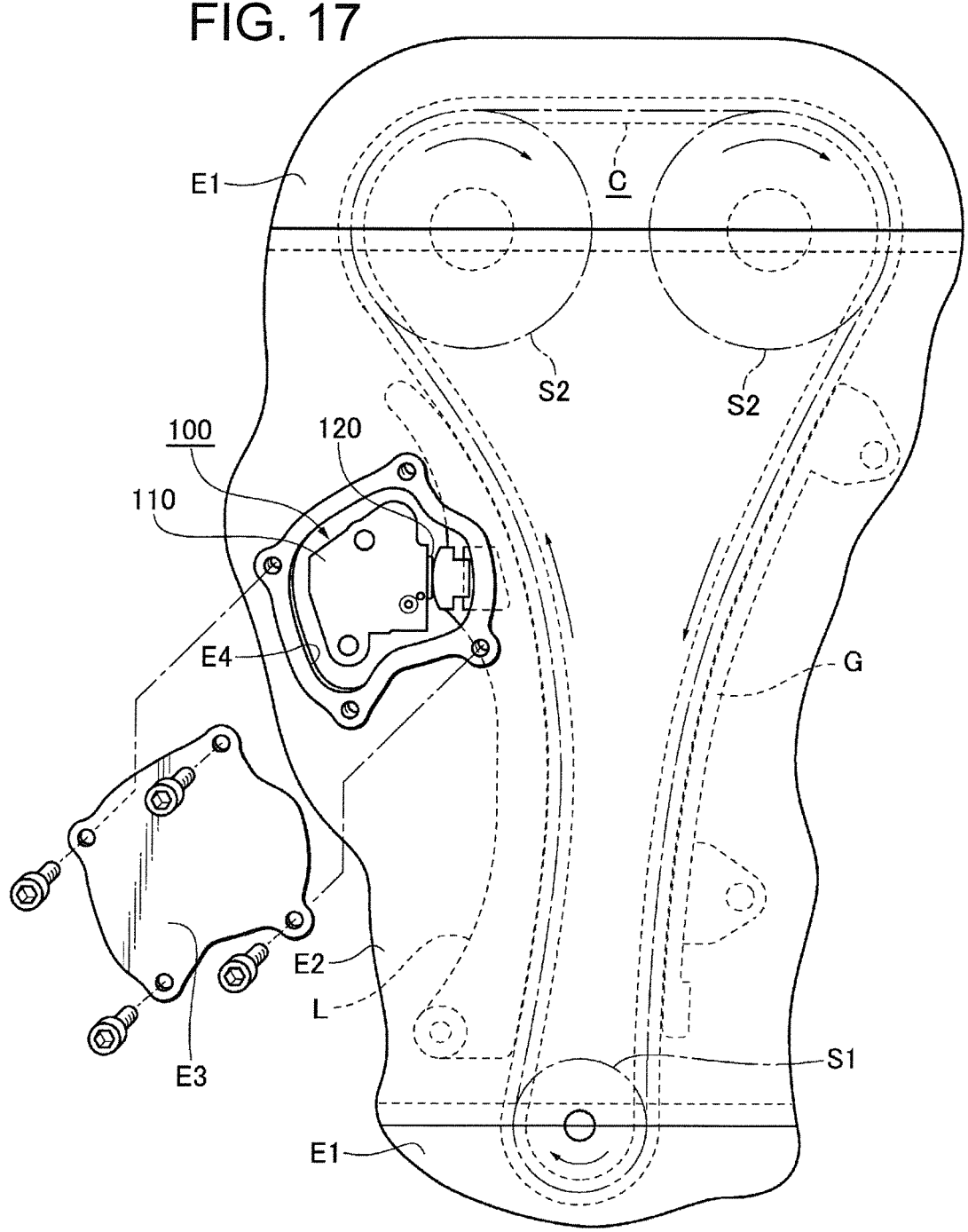
FIG. 17 illustrates a mode of maintenance implemented within the engine.
Figure 18:
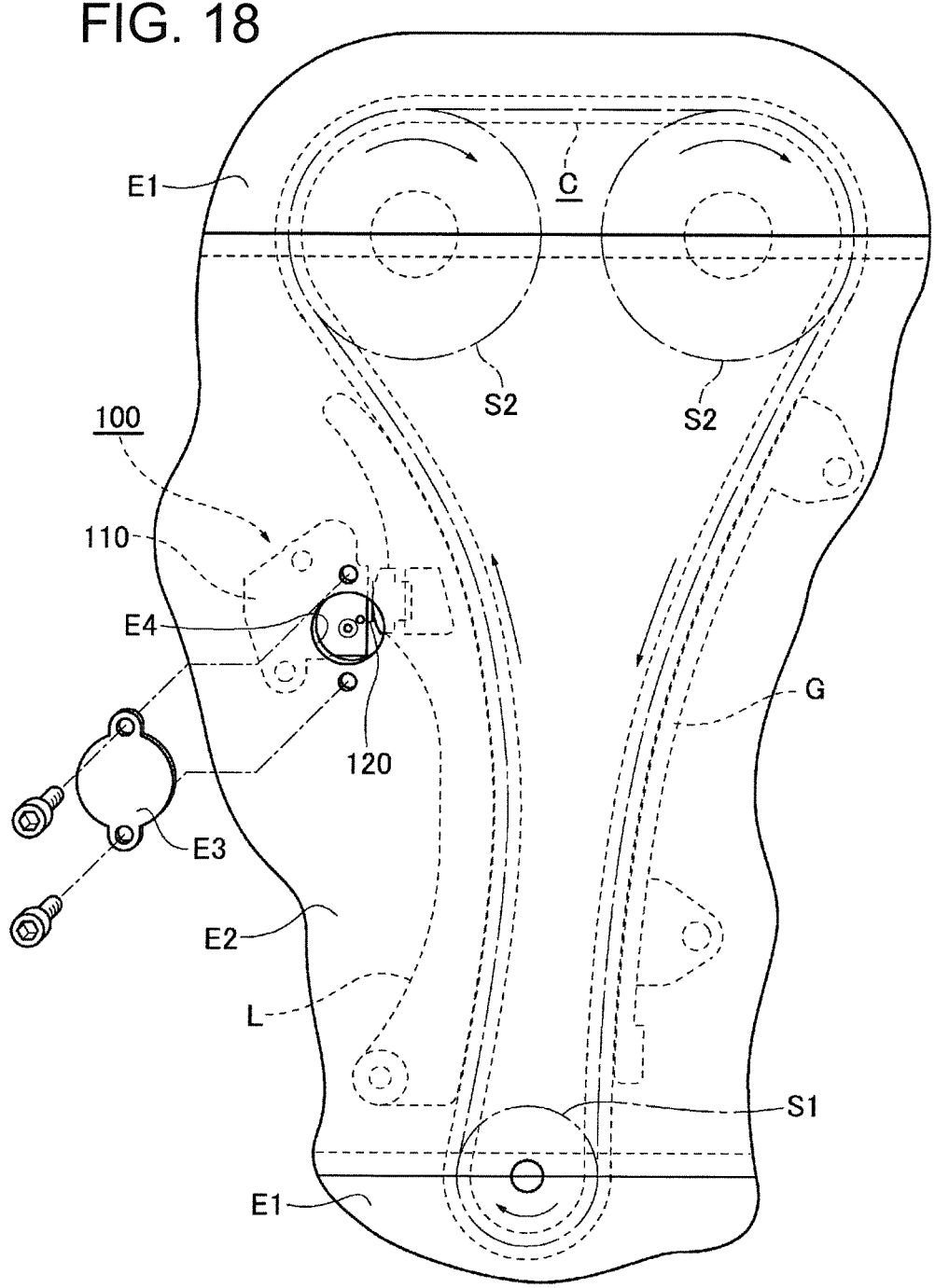
FIG. 18 illustrates a mode of another maintenance implemented within the engine.
Figure 19:
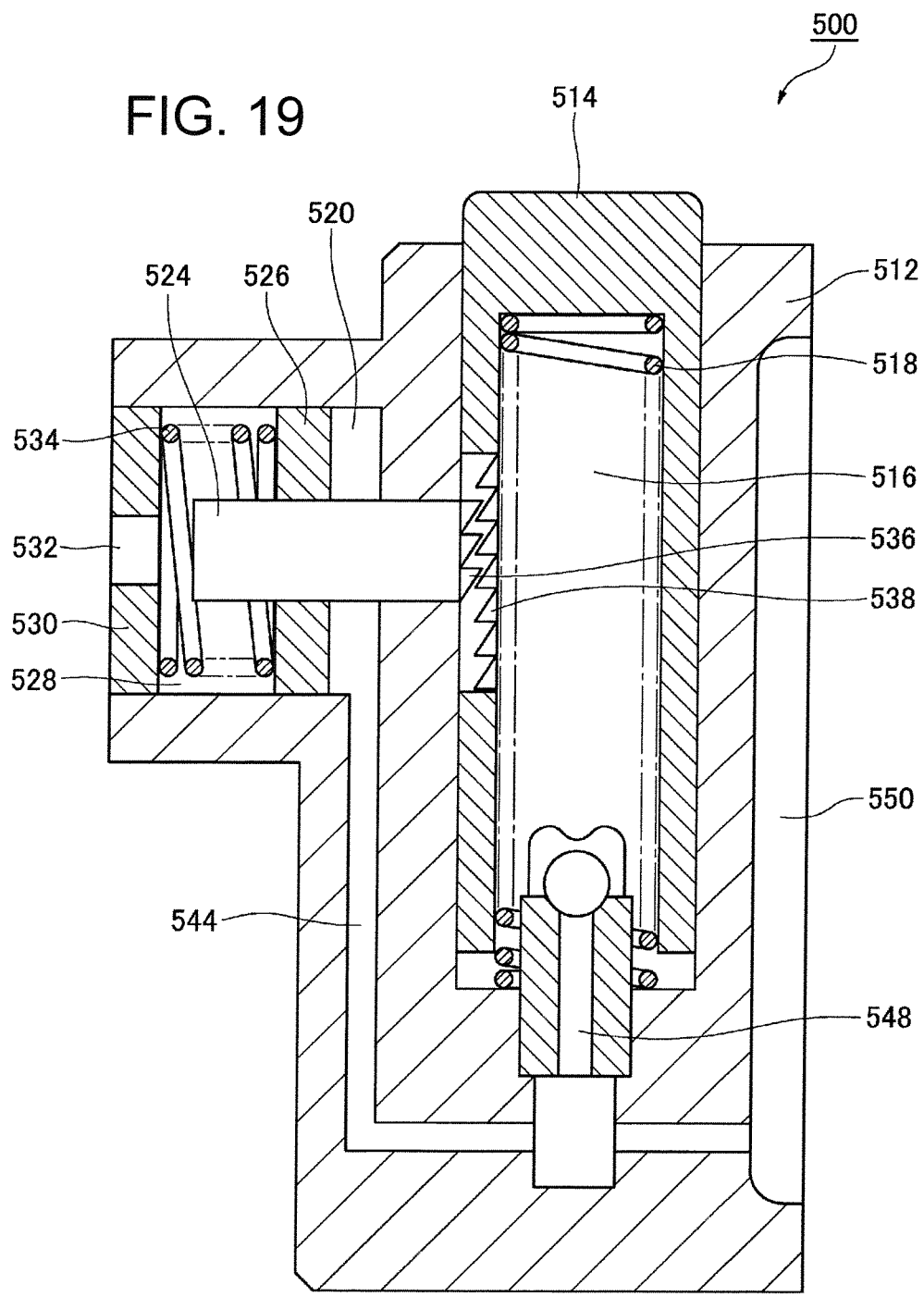
FIG. 19 is a section view of a prior art ratchet-type tensioner.

FIG. 17 illustrates a mode of maintenance implemented within the engine, and FIG. 18 illustrates a mode of another maintenance implemented within the engine.

As shown in FIG. 1, the ratchet-type tensioner 100 of the first embodiment of the invention is fixed to an engine body on a slack side of the timing chain C which is an endless chain wrapped around a driving sprocket S1 rotated and driven by a crankshaft of the engine and driven sprockets S2 fixed to camshafts. The ratchet-type tensioner 100 has a housing body 110 and the plunger 120 from which a housing body 110 projects out so as to apply tension to the slack side of the timing chain C through a movable lever A, rockably supported by the engine body, by pressing a back of the movable lever A near rocking end.

It is noted that a stationary guide G for guiding travel of the timing chain C is fixed to the engine body on a tension side of the timing chain C.

When the driving sprocket S1 rotates in a direction of an arrow in FIG. 1, the timing chain C travels in the direction of the arrow. Due to that, the sprockets S2 also rotates in the direction of the arrows, and the rotation of the sprocket S1 is transmitted to the sprockets S2.

As shown in FIG. 2, the ratchet-type tensioner 100 of the present embodiment includes the housing body 110 provided with an oil supplying passage 111 formed for introducing external pressure oil supplied from the engine block side, a plunger accommodating hole 112 formed in the housing body 110, the columnar plunger 120 that is supported in the housing body 110 that projects slidably out of the plunger accommodating hole 112 to apply tension to the traveling chain not shown, a high-pressure oil chamber R formed between the plunger accommodating hole 112 of the housing body 110 and a hollow portion 121 of the plunger 120, a plunger biasing spring 130 accommodated within the high-pressure oil chamber R and biasing the plunger 120 in the projecting direction of the plunger 120, a check valve unit 140 built in a bottom portion of the plunger accommodating hole 112 to block backward flow of the pressure oil from the high-pressure oil chamber R to the oil supplying passage 111, and a columnar ratchet element 150 fittingly inserted in a cylindrical ratchet accommodating hole 113 formed in the housing body 110 and sliding in a direction orthogonal to an advance/retract direction of the plunger 120, a ratchet biasing spring 160 that biases the ratchet element 150 such that ratchet teeth 151 provided in a plunger-side edge region of the ratchet element 150 engage with rack teeth 122 engraved on a side surface of the plunger, and a spring anchoring plug 170 fitted in a vicinity of a read end of the ratchet accommodating hole 113 and seating the ratchet biasing spring 160 as a stopper.

(Specific Unit Structure of Check Valve Unit 140)

While a specific unit structure of the check valve unit 140 described above may be any known structure as long as it is built in the bottom portion of the plunger accommodating hole 112 to block backward flow of the pressure oil from the high-pressure oil chamber R to the oil supplying passage 111, the following check valve unit 140 is adopted in the present embodiment. That is, the check valve unit 140 includes a ball seat 141 having an oil passage 141a connected to the oil supplying passage 111 of the housing body 110 described above, a check ball 142 that seats on a valve seat 141b of the ball seat 141, a ball biasing spring 143 that biases and presses the check ball 142 to the ball seat 141, and a bell-like retainer 144 that supports the ball biasing spring 143 and restricts a movement of the check ball 142.

(Specific Arrangement and Configuration of Ratchet Element 150)

As shown in FIG. 4, the ratchet element 150 described above has a ratchet whole length W longer than a ratchet outer-diameter D. This configuration permits to suppress an inclination the ratchet element 150, liable to occur in a sliding direction within the ratchet accommodating hole 113, and to prevent uneven wear of the ratchet element 150 and smoothly operates the plunger 120 and the ratchet element 150 even if an excessive load is applied to the ratchet element 150.

It is noted that the ratchet element 150 of the present embodiment is provided with the three ratchet teeth 151 having the equal teeth pitch and equal teeth height with the rack teeth 122 at the plunger-side edge region as shown in FIGS. 2 through 4 such that they engage equally to the rack teeth 122 engraved on the side surface of the plunger so as to disperse the load.

As shown in FIG. 4, the ratchet biasing spring 160 described above inserted within the ratchet element 150 concentrically along the sliding direction. With this arrangement, the ratchet biasing spring 160 is substantially inserted within a spring accommodating hole 153 of the ratchet element 150 and as compared to a case of fitting the ratchet biasing spring 160 around an outer circumferential surface of the ratchet element 150, a configuration for fitting the ratchet element 150 to the ratchet accommodating hole 113 is simplified and downsized.

Then, a biasing force of the ratchet biasing spring 160 is set to be greater than a component force in the sliding direction of the ratchet element 150 generated by a reaction force acting from the traveling chain side so as to retract the plunger 120 in starting the engine, and to be smaller than a component force in the sliding direction of the ratchet element 150 generated by a reaction force that acts from the traveling chain side so as to retract the plunger 120 when the tension of the chain is excessive after starting the engine.

With this arrangement, it is possible to reduce flapping noise of the timing chain by suppressing a retract displacement of the plunger 120 and also to prevent seizure of the plunger 120 by permitting the retract displacement of the plunger 120 when the tension of the timing chain is excessive after starting the engine. This arrangement also requires no special high-load accommodating plunger biasing spring 160, orifice mechanism nor oil-reserve mechanism, so that it is possible to downsize the tensioner itself by reducing a number of parts and production costs.

The spring locking plug 170 is a so-called stopping washer circumferentially having a large number of projecting tongues 171 fitted into a part near a rear end of the ratchet accommodating hole 113 and exhibit stopping elasticity as shown in FIG. 2. The spring locking plug 170 causes the rear end of the ratchet biasing spring 160 seat as shown in FIGS. 2 and 4.

(Specific Installing Configuration of Ratchet Releasing Mechanism X)

A specific configuration for installing a ratchet releasing mechanism X configured to disengage the ratchet teeth 151 of the ratchet element 150 from the rack teeth 122 of the plunger 120 by a tool pin T, i.e., the most characteristic configuration of the ratchet-type tensioner 100 of the present embodiment, will now be detailed further with reference to FIG. 5 and FIGS. 6 through 8.

As shown in FIG. 5 and FIGS. 6 through 8, the ratchet releasing mechanism X described above includes a ratchet releasing pin guide hole 114 formed through the housing body 110 and a ratchet releasing pin engaging hole 155 formed in a plunger-side edge region of the ratchet element 150.

With this arrangement, a pin edge portion T1 of the tool pin T inserted through the ratchet releasing pin guide hole 114 is guided and engaged with the ratchet releasing pin engaging hole 155 as shown in FIG. 8b, so that it is possible to reliably disengage the ratchet teeth 151 of the ratchet element 150 from the rack teeth 122 of the plunger 120 and to push back and retract the plunger 120.

The ratchet releasing pin guide hole 114 of the housing body 110 described above is formed into a shape of a funnel such that its diameter is contracted from an outer surface of the housing body 110 toward the ratchet releasing pin engaging hole 155 of the ratchet element 150 as shown in FIGS. 6 through 8, and the ratchet releasing pin engaging hole 155 in the ratchet element 150 is formed into a shape of a funnel such that its diameter is contracted from an outer circumferential surface of the ratchet element 150 toward a ratchet center axis O along the sliding direction of the ratchet element 150.

Thereby, in a case of disengaging the ratchet element 150 from the plunger 120 by the tool pin T, the pin edge portion T1 of the tool pin T comes into slidable contact with and is guided along the ratchet releasing pin guide hole 114 whose diameter is reduced like a funnel from the outer surface of the housing body 110 as shown in FIG. 6. Then, after reaching the ratchet releasing pin engaging hole 155 as shown in FIG. 7, the pin edge portion T1 of the tool pin T is positioned by being in slidable contact with the ratchet releasing pin engaging hole 155 whose diameter is also reduced like a funnel, and is inserted toward the ratchet center axis O of the ratchet element 150 as shown in FIG. 8.

Still further, as shown in FIG. 6, the ratchet releasing pin engaging hole 155 of the ratchet element 150 is provided in the plunger side edge region of the ratchet element 150 by being shifted away from the ratchet releasing pin guide hole 114 of the housing body 110 by more than a dimension of a tooth depth H of the ratchet teeth 151 in the condition in which the rack teeth 122 of the plunger 120 are engaged with the ratchet teeth 151 of the ratchet element 150.

With this arrangement, in a case disengaging the ratchet element 150 from the plunger 120 by the tool pin T, the pin edge portion T1 of the tool pin T inserted from the ratchet releasing pin guide hole 114 separates the ratchet teeth 151 of the ratchet element 150 from the rack teeth 122 of the plunger 120 by more than the dimension of the tooth depth H through the ratchet releasing pin engaging hole 155 as shown in FIG. 8.

(Specific Installing Configuration of Plunger Stopping Mechanism Y)

Figure 11:
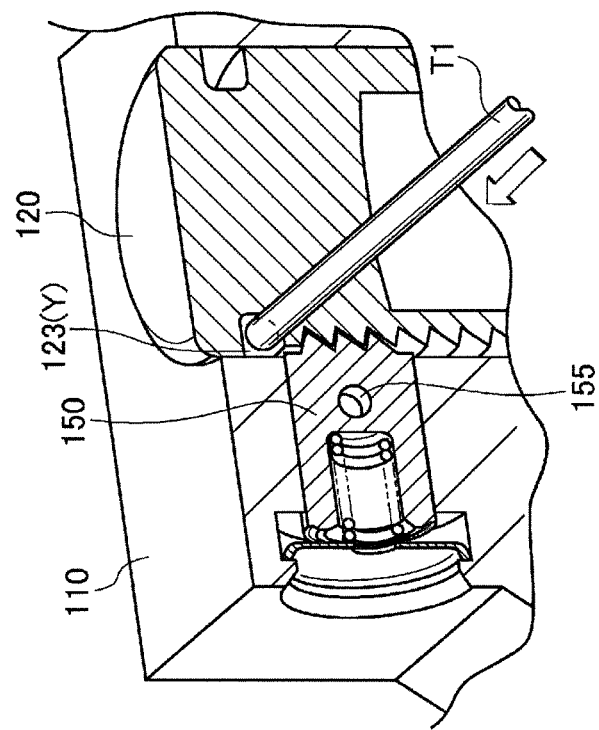
FIG. 11a is a perspective view showing a state in which the plunger is stopped from projecting out as the tool pin is locked to a plunger stopping pin locking groove through a plunger stopping pin insertion hole of the ratchet releasing mechanism.
FIG. 11b is a section view of a main part thereof.
Figure 11:
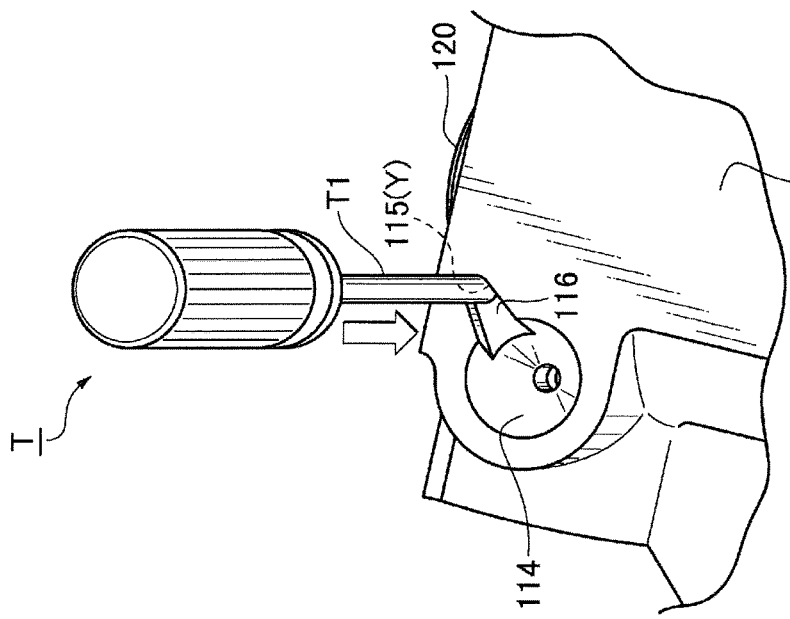

A specific configuration for installing a plunger stopping mechanism Y configured to temporarily stopping the plunger 120 from projecting out of the housing body 110 provided in the ratchet-type tensioner 100 by means of the tool pin T of the present embodiment will be detailed further with reference to FIGS. 9 through 11.

Firstly, the plunger stopping mechanism Y described above includes a plunger stopping pin insertion hole 115 formed through the housing body 110 and a plunger stopping pin locking groove 123 formed in a plunger projection end region of the plunger 120.

With this arrangement, the pin edge portion T1 of the tool pin T is inserted from the plunger stopping pin insertion hole 115 to the plunger projection end region of the plunger 120 and engages with the plunger stopping pin locking groove 123 as shown in FIGS. 9 and 11 in a condition in which the plunger 120 is pushed into the plunger accommodating hole 112 of the housing body 110, so that it is possible to temporarily stop the plunger 120 from projecting out of the housing body 110.

Still further, a tool pin guide groove 116 is formed on the housing body 110 to guide the pin edge portion T1 of the tool pin T from the ratchet releasing pin guide hole 114 to the plunger stopping pin insertion hole 115 in a slidable contact condition as shown in FIGS. 9 through 11.

With this arrangement, in a case of temporarily stopping the plunger 120 from projecting out of the housing body 110 by the tool pin T in a condition in which the plunger 120 is retracted by disengaging the ratchet teeth 151 of the ratchet element 150 from the rack teeth 122 of the plunger 120, the pin edge portion T1 of the tool pin T pulled out of the ratchet releasing pin guide hole 114 as shown in FIG. 9 is guided to the plunger stopping pin insertion hole 115 in a slidable contact state, while following a sense of contact of the operator, by the tool pin guide groove 116 provided so as to connect the ratchet releasing pin guide hole 114 with the plunger stopping pin insertion hole 115 as shown in FIG. 10.

Still further, the tool pin guide groove 116 described above is formed such that a width thereof is contracted from the ratchet releasing pin guide hole 114 to the plunger stopping pin insertion hole 115 as shown in FIGS. 9 through 11.

With this arrangement, in the case of temporarily stopping the plunger 120 from projecting out of the housing body 110 by the tool pin T in the condition in which the plunger 120 is retracted by disengaging the ratchet teeth 151 of the ratchet element 150 from the rack teeth 122 of the plunger 120, even if the pin edge portion T1 of the tool pin T pulled out of the ratchet releasing pin guide hole 114 is misaligned, the pin edge portion T1 of the tool pin T is gradually positioned and guided to the plunger stopping pin insertion hole 115 by following the tool pin guide groove 116 provided so as to connect the ratchet releasing pin guide hole 114 with the plunger stopping pin insertion hole 115.

(Disengage Operation of Plunger and Ratchet)

A mutual relationship between the rack teeth 122 of the plunger 120, the ratchet teeth 151 and the ratchet biasing spring 160 of the ratchet-type tensioner 100 of the present embodiment will be detailed further with reference to FIG. 3 and to FIGS. 12 to 14.

Firstly, as shown in FIG. 12, f1>Fs always when the plunger 120 projects in starting the engine and during normal operation after starting the engine and the plunger 120 advances while pushing back the ratchet element 150.

Here, the biasing force Fs of the ratchet biasing spring 160 used in the present embodiment is set to be greater than a component force f1 in the sliding direction of the ratchet element 150 generated by a reaction force F1 acting from the traveling chain side and retracting the plunger 120 in starting the engine as shown in FIG. 13, and to be smaller than a component force f2 in the sliding direction of a reaction force F2 acting from the traveling chain side and retracting the plunger 120 when a tension of the chain is excessive after starting the engine as shown in FIG. 14.

Thus, f1>Fs always when the plunger 120 projects in starting the engine and the plunger 120 advances following a lever not shown. Then, when a reaction force F1 that retracts the plunger 120 is generated from the traveling chain side in starting the engine as shown in FIG. 13, the ball biasing spring Fs of the ratchet biasing spring 160 which is greater than the component force f1 in the sliding direction of the ratchet element 150 described above acts on the ratchet teeth 151 of the ratchet element 150 so as to engage with the rack teeth 122 of the plunger 120 and blocks a retract displacement of the plunger 120 by restricting the move in the retract direction of the plunger 120 that has caused a backlash.

Then, when a reaction force F2 that retracts the plunger 120 is generated from the traveling chain side when the tension of the chain is excessive after starting the engine as shown in FIG. 14, the component force f2 in the sliding direction of the ratchet element 150 described above becomes greater than the biasing force Fs of the ratchet biasing spring 160.

Then, as shown in FIG. 15, the ratchet teeth 151 of the ratchet element 150 disengage from the rack teeth 122 of the plunger 120, and the plunger 120 retracts by one tooth or several teeth of the rack teeth 122 until when the reaction force F of the ratchet biasing spring 160 becomes relatively greater than the component force f2 in the sliding direction of the ratchet element 150. Thus, the ratchet-type tensioner 100 does not restrict the move in the retract direction of the plunger 120 that has caused the backlash due to the excessive tension of the chain after starting the engine and allows the retract displacement as shown in FIG. 16.

Accordingly, the biasing force of the plunger biasing spring 130 may be in a level that projects and advances the plunger 120 even though it is greater than the biasing force Fs of the ratchet biasing spring 160. Then, it is also possible to adjust timing of the disengagement caused by the excessive tension of the chain after starting the engine by adjusting the biasing force Fs of the ratchet biasing spring 160 within the level described above.

More specifically, as shown in FIG. 3, the ratchet-type tensioner 100 is configured such that the rack teeth 122 of the plunger 120 are formed concavo-convexly by stop surfaces 122*a* which are inclined toward the plunger advance side with respect to the sliding direction of the ratchet element 150 and sliding surfaces 122*b* which are inclined toward the plunger retract side with respect to the sliding direction of the ratchet element 150. Still further, the ratchet teeth 151 of the ratchet element 150 are formed concavo-convexly by stop counter surfaces 151*a* inclined toward the plunger advance side with respect to the sliding direction of the ratchet element 150 and sliding counter surfaces 151*b* inclined toward the plunger retract direction with respect to the sliding direction of the ratchet element 150.

With this configuration, when the reaction force F2 that retracts the plunger 120 is generated from the traveling chain side when the tension of the chain is excessive after starting the engine as shown in FIG. 14, the reaction force F2 acts on the stop counter surface 151*a* of the ratchet element 150 through the stop surface 122*a* on the plunger side as a component force fh. This component force fh acting on the stop counter surface 151*a* of the ratchet element 150 acts as a further smaller component force f2 in the sliding direction so as to disengage the ratchet teeth 151 of the ratchet element 150 from the rack teeth 122. Then, as shown in FIGS. 15 and 16, the rack teeth 122 of the plunger 120 return by one tooth or several teeth by sliding the sliding counter surfaces 151*b* through the stop counter surfaces 151*a* of the ratchet element 150.

Then, an inclination angle θ of the stop surface 122*a* formed on the plunger 120 is set to be smaller than an inclination angle α of the sliding surface 122*b*.

With this arrangement, even if the reaction force F1 that retracts the plunger 120 is generated from the traveling chain side in starting the engine, it is possible to block the ratchet teeth 151 of the ratchet element 150 from disengaging from the rack teeth 122 of the plunger 120.

Accordingly, even when the plunger 120 advances excessively due to the temperature change of the engine as described above and an overload is generated due to backstop, a relationship of magnitudes of the component force f2 in the sliding direction generated by the reaction force F2 acting from the traveling chain side so as to retract the plunger 120 due to excessive chain tension after starting the engine and the biasing force Fs of the plunger 120 turns out as follows:

$f2 = F2 \times \cos\theta \times \sin\theta \times \mu$ $f2 > Fs$

Where, μ is a friction coefficient between the rack teeth 122 of the plunger 120 and the ratchet teeth 151 of the ratchet element 150.

A relationship of magnitudes of the component force f1 in the sliding direction of the ratchet element 150 generated by the reaction force F1 acting on the plunger 120 to retract from the traveling chain side in starting the engine and the biasing force Fs of the ratchet element 150 turns out as follows as shown in FIG. 13 in blocking the retract displacement of the plunger 120 by restricting the move of the plunger 120 that has caused a backlash in starting the engine:

$f1 = F1 \times \cos\theta \times \sin\theta \times \mu$ $f1 < Fs$

Where, μ is a friction coefficient between the rack teeth 122 of the plunger 120 and the ratchet teeth 151 of the ratchet element 150.

Next, disengagement operations of the rack teeth 122 of the plunger 120 and the ratchet teeth 151 of the ratchet element 150 when the tension of the chain is excessive after starting the engine, which is the most characteristic part of the ratchet-type tensioner 100 of the present embodiment, will be explained below with reference to FIGS. 14 through 16.

It is noted that imaginary lines indicated on the plunger front end side in FIGS. 14 to 16 indicate front end position of the plunger 120 in the condition shown in FIG. 14, i.e., when the excessive chain tension is generated after starting the engine. Imaginary lines indicated in the vicinity of the ratchet element in FIGS. 15 and 16 indicate position of the ratchet element 150 in the condition shown in FIG. 14, i.e., when the excessive chain tension is generated after starting the engine.

When the reaction force F2 that retracts the plunger 120 is generated from the traveling chain side when the tension of the chain is excessive after starting the engine, this reaction force F2 acts on the stop counter surface 151*a* of the ratchet element 150 as the component force fh through the stop surface 122*a* on the plunger 120 side, and the component force fh acting on the stop counter surface 151*a* of the ratchet element 150 act as the further smaller component force f2 in the sliding direction of the ratchet element 150.

Then, when the component force f2 in the sliding direction of the ratchet element 150 described above acts as described above, the plunger 120 starts to retract as the stop surfaces 122*a* on the plunger side slidably move over the stop counter surfaces 151*a* of the ratchet element 150 side as shown in FIG. 15. Then, the rack teeth 122 of the plunger 120 disengage from the ratchet teeth 151 of the ratchet element 150.

Next, at the same time when the rack teeth 122 of the plunger 120 are disengaged from the ratchet teeth 151 of the ratchet element 150, the sliding surface 122*b* on the plunger side starts to slidably move over the sliding counter surface 151*b* on the ratchet element 150 side and the plunger 120 continues to retract.

When the plunger 120 continues to retract further while slidably moving the sliding surface 122*b* on the plunger side over the sliding counter surface 151*b* on the ratchet side, the succeeding new stop surface 122*a* on the plunger 120 butts the stop counter surface 151*a* of the ratchet element 150 side as shown in FIG. 16 and allows the retract displacement. As the plunger 120 returns by one tooth or several teeth of the rack teeth 122 as described above, it is possible to release the overload caused by excessive projection of the plunger 120 that occurs due to temperature change of the engine.

The ratchet-type tensioner 100 of the first embodiment of the invention thus obtained can not only apply the tension to the timing chain C within the engine block wall E1, but also bring about the following advantageous effects.

That is, the ratchet releasing mechanism X configured to release the engagement of the ratchet teeth 151 of the ratchet element 150 with the rack teeth 122 of the plunger 120 by means of the tool pin T includes the ratchet releasing pin guide hole 114 formed through the housing body 110 in the shape of a funnel such that its diameter is contracted from the outer surface of the housing body 110 toward the ratchet releasing pin engaging hole 155 of the ratchet element 150 to insert the pin edge portion T1 of the tool pin T into the plunger-side edge region of the ratchet element 150, and the ratchet releasing pin engaging hole 155 formed in the plunger-side edge region of the ratchet element 150 in the shape of a funnel such that its diameter is contracted from the outer circumferential surface of the ratchet element 150 toward the center axis O along the sliding direction of the ratchet element 150 to guide and engage the pin edge portion T1 of the tool pin T inserted from the ratchet releasing pin guide hole 114. Still further, the ratchet releasing pin engaging hole 155 of the ratchet element 150 is provided in the plunger side edge region of the ratchet element 150 by being shifted away from the ratchet releasing pin guide hole 114 of the housing body 110 by more than a dimension of a tooth depth H of the ratchet teeth 151 in the condition in which the rack teeth 122 of the plunger 120 are engaged with the ratchet teeth 151 of the ratchet element 150.

Still more, the ratchet releasing pin engaging hole 155 of the ratchet element 150 is provided in the plunger side edge region of the ratchet element 150 by being shifted away from the ratchet releasing pin guide hole 114 of the housing body 110 by more than a dimension of a tooth depth H of the ratchet teeth 151 in the condition in which the rack teeth 122 of the plunger 120 are engaged with the ratchet teeth 151 of the ratchet element 150. Accordingly, even if the spaces around the maintenance hole E4 provided through the maintenance opening lid E3 provided in the engine cover E2 that covers the engine block wall E1 as shown in FIG. 17 or 18 are narrow in carrying out the maintenance works such as positioning and replacing parts of the ratchet-type tensioner and the timing chain by loosening the timing chain, it is possible to readily disengage the ratchet teeth 151 of the ratchet element 150 from the rack teeth 122 of the plunger 120 by reliably engaging the pin edge portion T1 of the tool pin T from the ratchet releasing pin guide hole 114 to the ratchet releasing pin engaging hole 155.

Then, the plunger stopping mechanism Y for temporarily stopping the plunger 120 from projecting out of the housing body 110 by means of the tool pin T includes the plunger stopping pin insertion hole 115, formed through the housing body 110, for inserting the pin edge portion T1 of the tool pin T to the plunger projection end region of the plunger 120, and the plunger stopping pin locking groove 123 formed in the plunger projection end region of the plunger 120 for locking the tool pin T inserted from the plunger stopping pin insertion hole 115.

Accordingly, it is possible to remarkably reduce the workload of the maintenance works such as positioning and replacing parts of the ratchet-type tensioner and the timing chain in mounting the tensioner within the engine or in maintaining the engine.

Still more, the tool pin guide groove 116 formed to guide the pin edge portion T1 of the tool pin T from the ratchet releasing pin guide hole 114 to the plunger stopping pin insertion hole 115 in a slidable contact condition is formed on the housing body 110 such that its width is contracted from the ratchet releasing pin guide hole 114 toward the plunger stopping pin insertion hole 115, so that even if the spaces around the maintenance hole E4 provided through the maintenance opening lid E3 provided in the engine cover E2 that covers the engine block wall E1 as shown in FIG. 17 or 18 are narrow in carrying out the maintenance works such as positioning and replacing parts of the ratchet-type tensioner and the timing chain by loosening the timing chain, it is possible to readily and reliably insert the pin edge portion T1 of the tool pin T from the ratchet releasing pin guide hole 114 to the plunger stopping pin inserting hole 115. Thus, the advantageous effects of the present embodiment are remarkable.

DESCRIPTION OF REFERENCE NUMERALS

100 Ratchet-type tensioner
110 housing body
111 Oil supplying passage
112 Plunger accommodating hole
113 Ratchet accommodating hole
113a Housing-side concave groove
114 Ratchet releasing pin guide hole
115 Plunger stopping pin insertion hole
116 Tool pin guide groove
120 Plunger
121 Hollow portion
122 Rack tooth
122a stop surface
122b Sliding surface
123 Plunger stopping pin locking groove
130 Plunger biasing spring
140 Check valve unit
141 Ball seat
141a Oil passage
141b Valve seat
142 Check ball
143 Ball biasing spring
144 Bell-like retainer
150 Ratchet element
151 Ratchet tooth
151a Stop counter surface
151b Sliding counter surface
153 Spring accommodating hole
155 Ratchet releasing pin engaging hole
160 Ratchet biasing spring
170 Spring anchoring plug
171 Projecting tongue piece
S1 Driving sprocket
S2 Driven sprocket
C Timing chain
E1 Engine block wall
E2 Engine cover
E3 Maintenance opening lid
E4 Maintenance hole
L Movable lever
G Stationary guide
R High pressure oil chamber
D Dimension of ratchet outer diameter
W Dimension of ratchet whole length
O Ratchet center axis
H Dimension of depth of ratchet tooth
X Ratchet releasing mechanism
Y plunger stopping mechanism
Fs Biasing force of ratchet biasing spring
F1 Reaction force retracting plunger in starting engine
F2 Reaction force retracting plunger when tension of chain is excessive after starting engine
f1 Component force in sliding direction of ratchet element generated by reaction force F1
f2 Component force in sliding direction of ratchet element generated by reaction force F2 fh component force acting on stop surface of plunger by reaction force F2
θ Inclination angle of stop surface formed on plunger
α Inclination angle of sliding surface formed on plunger
T Tool pin
T1 Pin edge portion
500 Prior art ratchet-type tensioner
512 housing
514 Plunger
516 Oil chamber
518 Spring
520 Sub-oil chamber
524 Rod
526 Piston
528 Air chamber
530 Cap
532 Air communicating hole
534 Second spring
536 Engagement tooth
538 Rack
544 Oil passage
548 Oil passage
550 Oil reservoir

The invention claimed is:

1. A ratchet-type tensioner, comprising:
a housing body provided with an oil supplying passage of external pressure oil;
a plunger accommodating hole formed in the housing body;
a plunger that projects slidably out of the plunger accommodating hole in a projecting direction;
a high-pressure oil chamber formed between the plunger accommodating hole of the housing body and a hollow portion of the plunger;
a plunger biasing spring accommodated within the high-pressure oil chamber and biasing the plunger in said projecting direction;
a columnar ratchet element fittingly inserted in a cylindrical ratchet accommodating hole formed in the housing body and sliding in a direction orthogonal to an advance/retract direction of the plunger;
a ratchet biasing spring that biases the ratchet element such that ratchet teeth provided in a plunger-side edge region of the ratchet element engage with rack teeth engraved on a side surface of the plunger; and
a spring anchoring plug fitted in the vicinity of a rear end of the ratchet accommodating hole and seating the ratchet biasing spring,
wherein a ratchet releasing mechanism configured to disengage the ratchet teeth of the ratchet element from the rack teeth of the plunger by means of a tool pin includes a ratchet releasing pin guide hole formed through the housing body to insert a pin edge portion of the tool pin toward a plunger-side edge region of the ratchet element and a ratchet releasing pin engaging hole formed in the plunger-side edge region of the ratchet element to guide and engage with the pin edge portion of the tool pin inserted through the ratchet releasing pin guide hole.

2. The ratchet-type tensioner according to claim 1, wherein:
the ratchet releasing pin guide hole of the housing body is formed into a shape of a funnel such that the diameter of said funnel is contracted from an outer surface of the housing body toward the ratchet releasing pin engaging hole of the ratchet element; and
the ratchet releasing pin engaging hole in the ratchet element is formed into a shape of a funnel such that the diameter of said releasing pin engaging hole is contracted from an outer circumferential surface of the ratchet element toward a ratchet center axis along the sliding direction of the ratchet element.

3. The ratchet-type tensioner according to claim 1, wherein the ratchet releasing pin engaging hole of the ratchet element is provided in the plunger side edge region of the ratchet element by being shifted away from the ratchet releasing pin guide hole of the housing body by more than a dimension of a tooth depth of the ratchet teeth in the condition in which the rack teeth of the plunger are engaged with the ratchet teeth of the ratchet element.

4. The ratchet-type tensioner according to claim 1, further comprising a plunger stopping mechanism for temporarily stopping the plunger from projecting out of the housing body by means of the tool pin, the plunger stopping mechanism including:
a plunger stopping pin insertion hole, formed through the housing body, for inserting the pin edge portion of the tool pin into a plunger projection end region of the plunger; and
a plunger stopping pin locking groove formed in the plunger projection end region of the plunger for locking the tool pin inserted from the plunger stopping pin insertion hole.

5. The ratchet-type tensioner according to claim 4, further comprising a tool pin guide groove formed on the housing body to guide the pin edge portion of the tool pin from the ratchet releasing pin guide hole to the plunger stopping pin insertion hole in a slidable contact condition.

6. The ratchet-type tensioner according to claim 5, wherein the tool pin guide groove is formed such that a width thereof is contracted from the ratchet releasing pin guide hole toward the plunger stopping pin insertion hole.

7. The ratchet-type tensioner according to claim 1, wherein a biasing force of the ratchet biasing spring is set to be greater than a component force in the sliding direction generated by a reaction force that acts from the traveling chain side so as to retract the plunger in starting the engine, and to be smaller than a component force in the sliding direction generated by a reaction force that acts from the traveling chain side so as to retract the plunger when a tension of the chain is excessive after starting the engine.

8. The ratchet-type tensioner according to claim 1, wherein:
the rack teeth of the plunger are formed concavo-convexly respectively by stop surfaces inclined toward the plunger advance side with respect to the sliding direction of the ratchet element and sliding surfaces inclined toward the plunger retract side with respect to the sliding direction of the ratchet element; and
the ratchet teeth of the ratchet element are formed concavo-convexly respectively by stop counter surfaces inclined toward the plunger advance side with respect to the sliding direction of the ratchet element and sliding counter surfaces inclined toward the plunger retraction side with respect to the sliding direction of the ratchet element.

9. The ratchet-type tensioner according to claim 8, wherein an inclination angle of the stop surface is set to be smaller than an inclination angle of the sliding surface.

10. The ratchet-type tensioner according to claim 1, wherein the ratchet element has a ratchet whole length longer than a ratchet outer diameter.

11. The ratchet-type tensioner according to claim 1, wherein the ratchet biasing spring is inserted into a spring accommodating hole of the ratchet element along the sliding direction.

* * * * *